United States Patent [19]
Kawamura et al.

[11] Patent Number: 5,687,401
[45] Date of Patent: Nov. 11, 1997

[54] HIGH VARIABLE-POWER RATIO, HIGH APERTURE RATIO, ZOOM OPTICAL SYSTEM

[75] Inventors: Atsushi Kawamura, Yokosuka; Kazuyasu Ohashi, Tokyo; Akiko Ozawa, Chigasaki, all of Japan

[73] Assignee: Ricoh Company, Ltd., Tokyo, Japan

[21] Appl. No.: 696,254

[22] Filed: Aug. 13, 1996

[30] Foreign Application Priority Data

Aug. 19, 1995 [JP] Japan .................. 7-233248

[51] Int. Cl.$^6$ .................. G02B 15/14
[52] U.S. Cl. .................. 396/79; 396/72; 396/451; 396/462; 359/676; 359/686; 359/695
[58] Field of Search .................. 396/451, 462, 396/72, 79; 359/676, 677, 686, 695

[56] References Cited

U.S. PATENT DOCUMENTS

| | | |
|---|---|---|
| 4,576,444 | 3/1986 | Kawamura . |
| 4,634,236 | 1/1987 | Masumoto .................. 350/427 |
| 4,653,873 | 3/1987 | Kawamura . |
| 4,673,259 | 6/1987 | Kawamura . |
| 5,379,154 | 1/1995 | Shibayama et al. . |
| 5,434,712 | 7/1995 | Ito . |
| 5,440,429 | 8/1995 | Kim . |
| 5,446,592 | 8/1995 | Kohno et al. . |
| 5,459,616 | 10/1995 | Kawamura et al. . |
| 5,477,297 | 12/1995 | Suzuki .................. 354/195.1 |

FOREIGN PATENT DOCUMENTS

| | | |
|---|---|---|
| 1-252915 | 10/1989 | Japan . |
| 1-314219 | 12/1989 | Japan . |
| 6-265788 | 9/1994 | Japan . |

OTHER PUBLICATIONS

English Book, "Fundamentals of Optics," 4th Edition, by Francis A. Jenkins & Harvey E. White, McGraw–Hill Book Company.

*Primary Examiner*—Daniel P. Malley
*Attorney, Agent, or Firm*—Oblon, Spivak, McClelland, Maier & Neustadt, P.C.

[57] ABSTRACT

A first zoom lens group, a second zoom lens group, a third zoom lens group and a fourth zoom lens group are arranged on an optical axis in that order from an object side. The first zoom lens group has a negative lens and a positive lens arranged in that order from the object side, the first zoom lens group as a whole acting as a zoom lens group having a positive focal length. The second zoom lens group has a negative lens and a positive lens arranged from the object side in that order, the second zoom lens group as a whole acting as a zoom lens group having a negative focal length. The third zoom lens group has a double concave lens and a double convex lens arranged in that order from the object side, the third zoom lens group as a whole acting as a zoom lens group having a positive focal length, the third zoom lens group being provided with a diaphragm. The fourth zoom lens group has a positive lens and a negative lens arranged from the object side in that order, the fourth zoom lens group as a whole acting as a zoom lens group having a negative focal length.

10 Claims, 23 Drawing Sheets

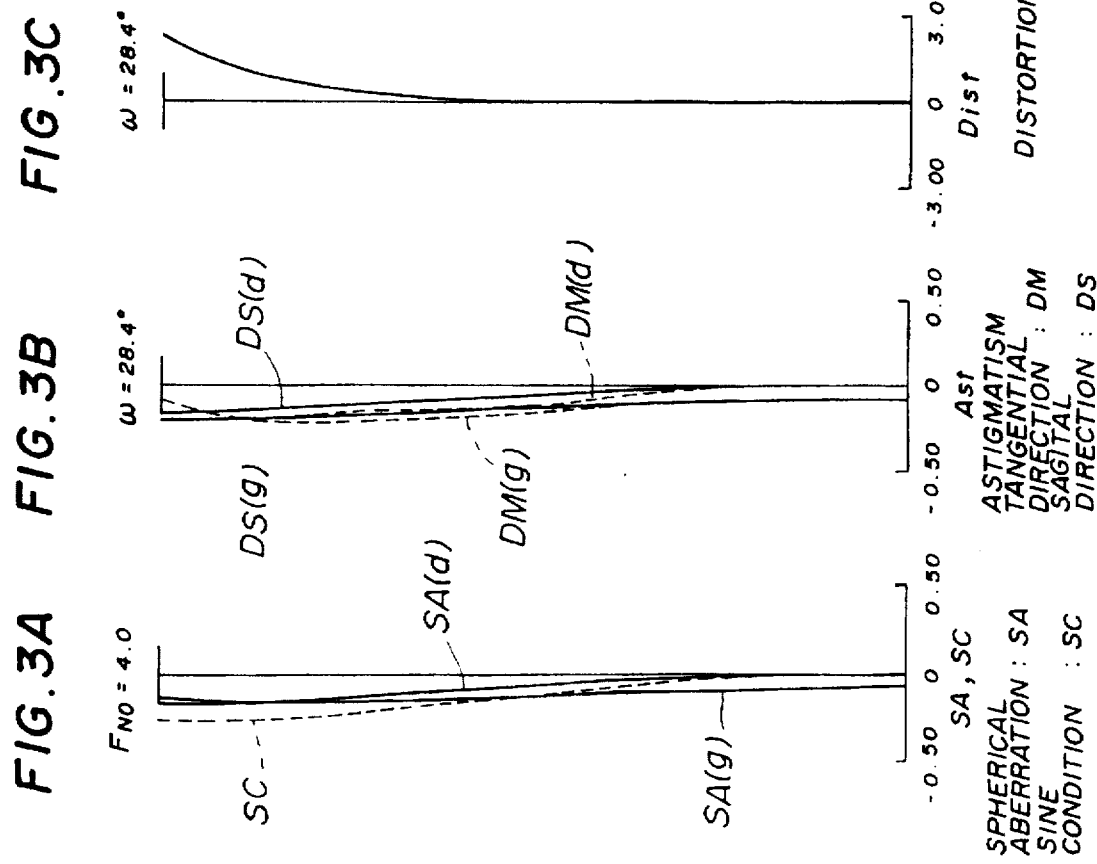

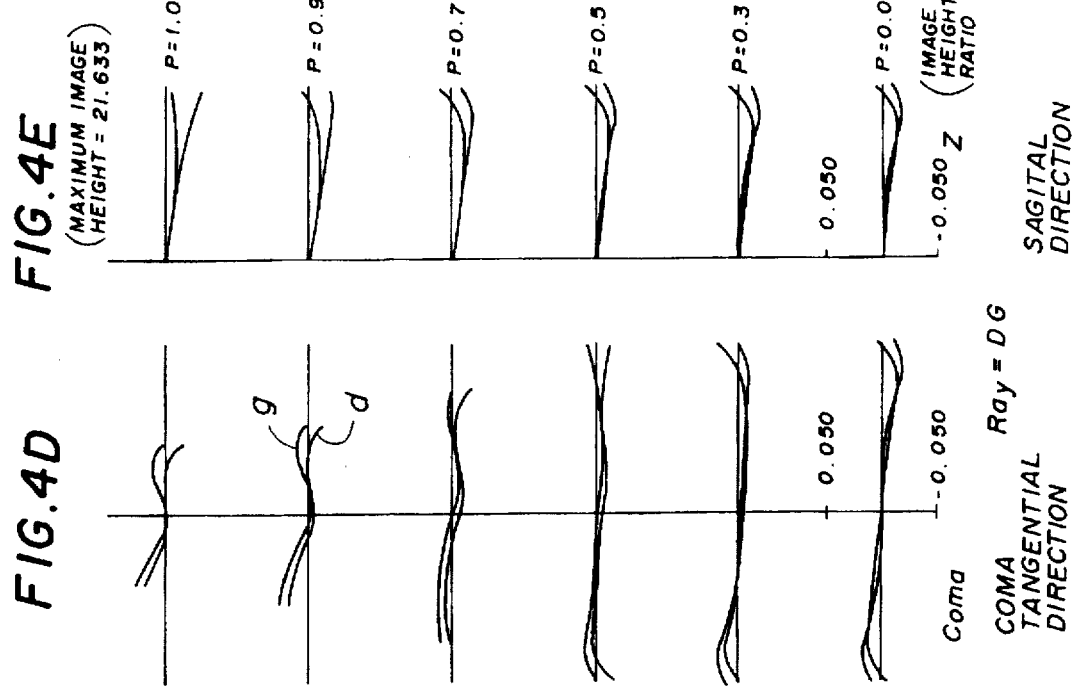
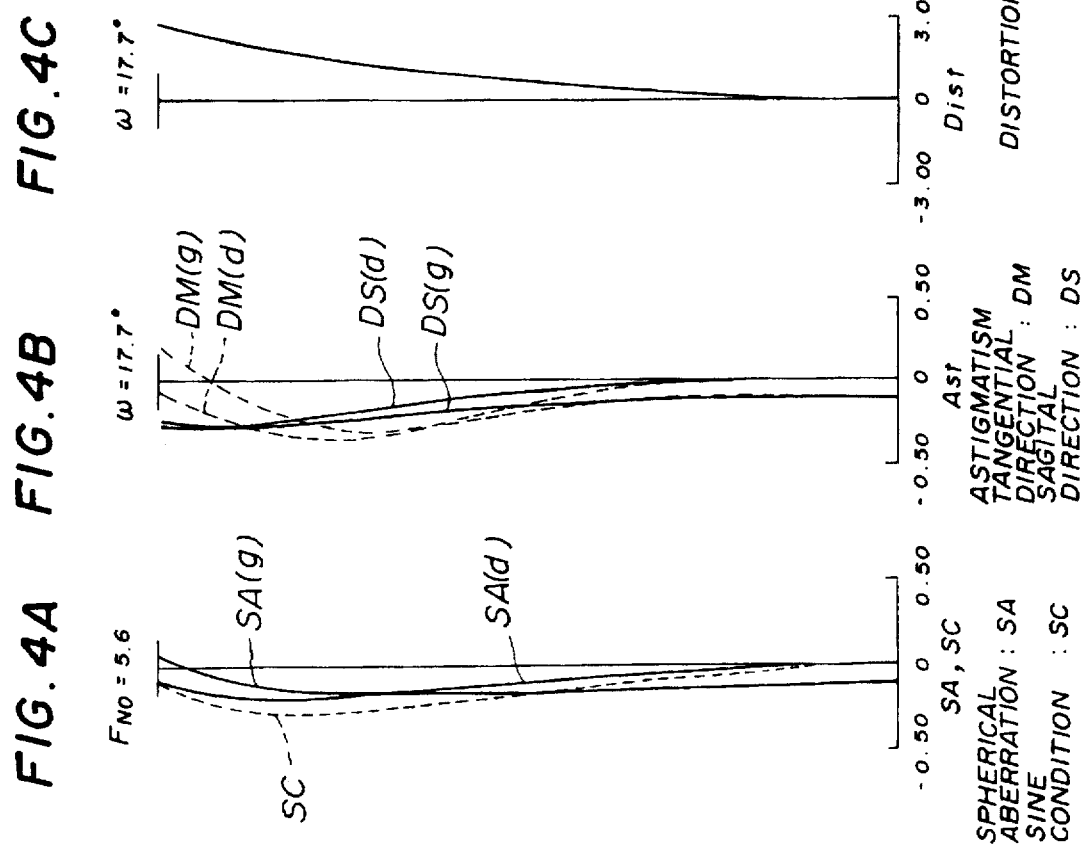

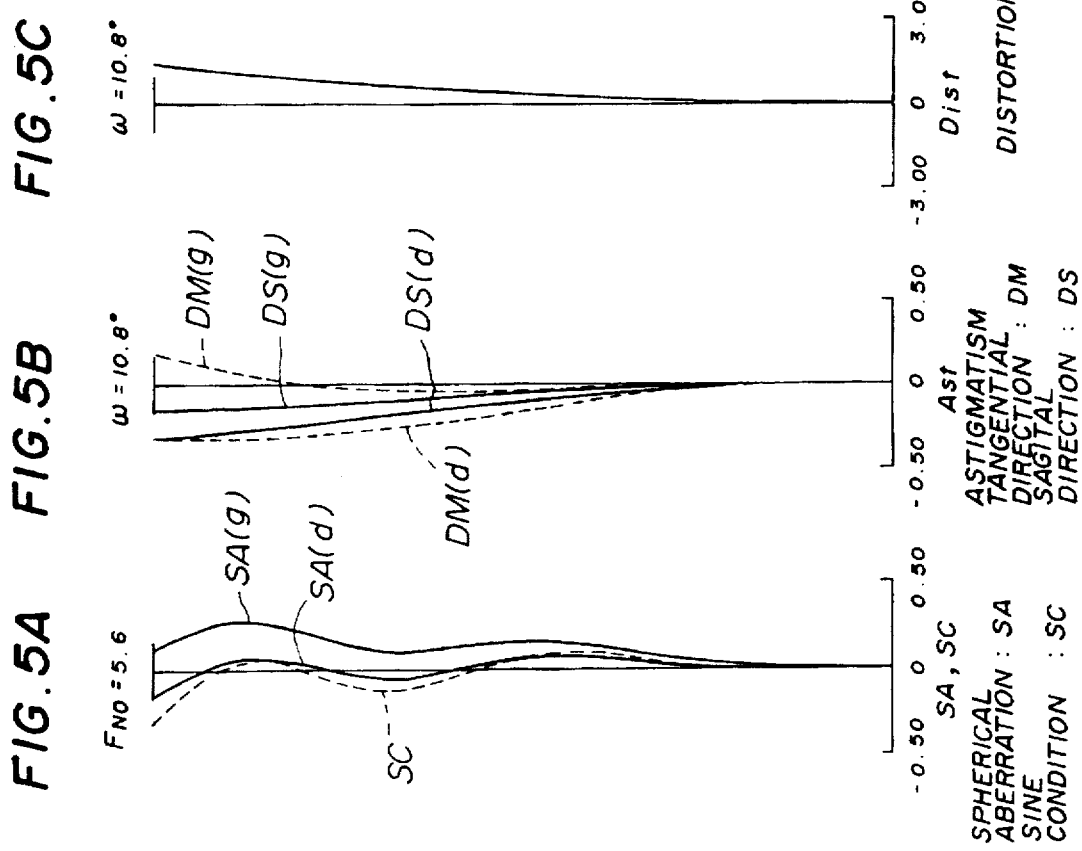

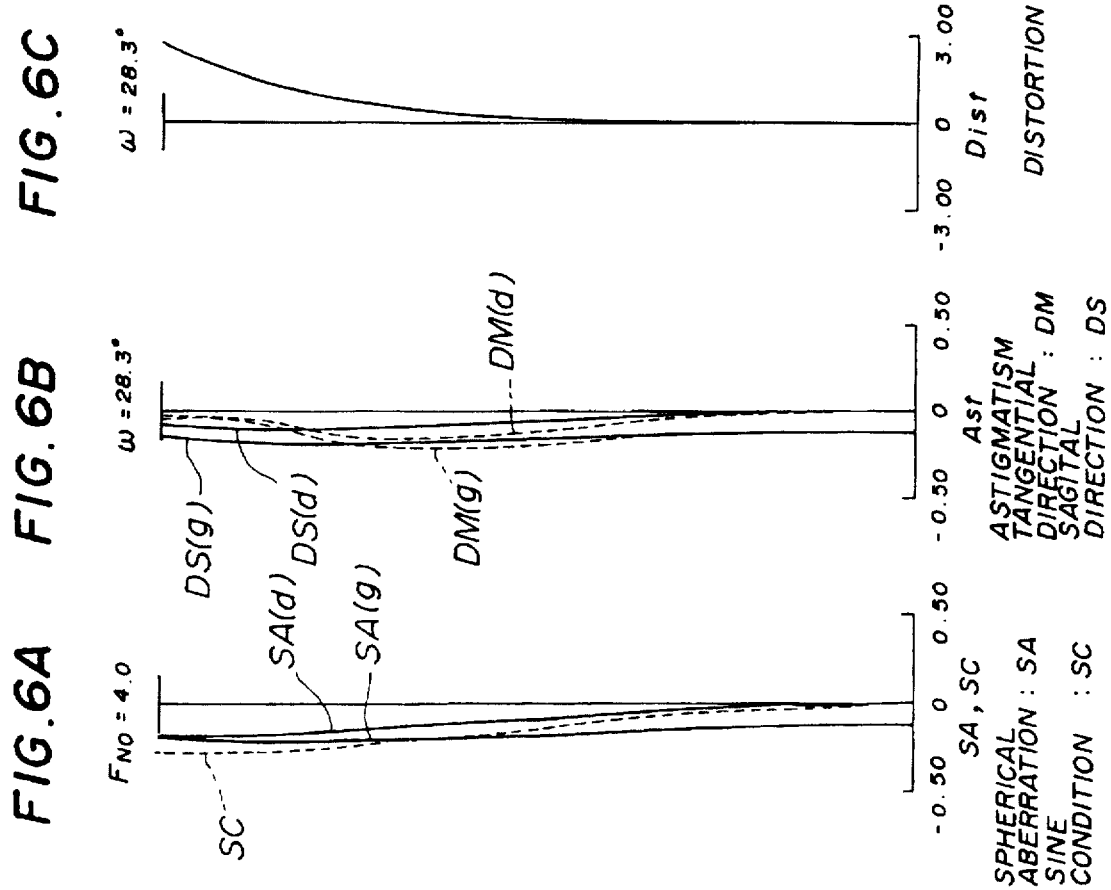

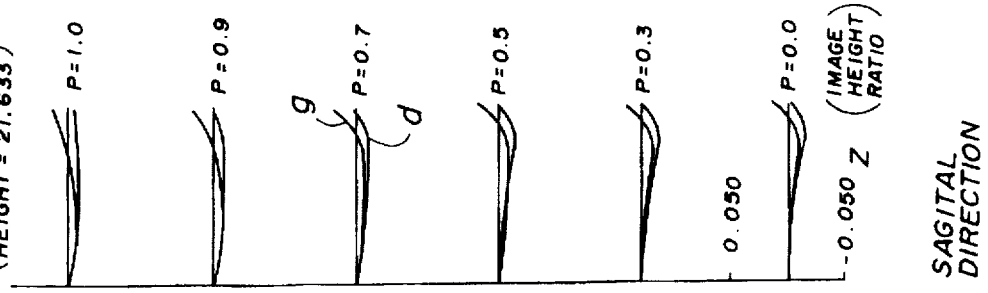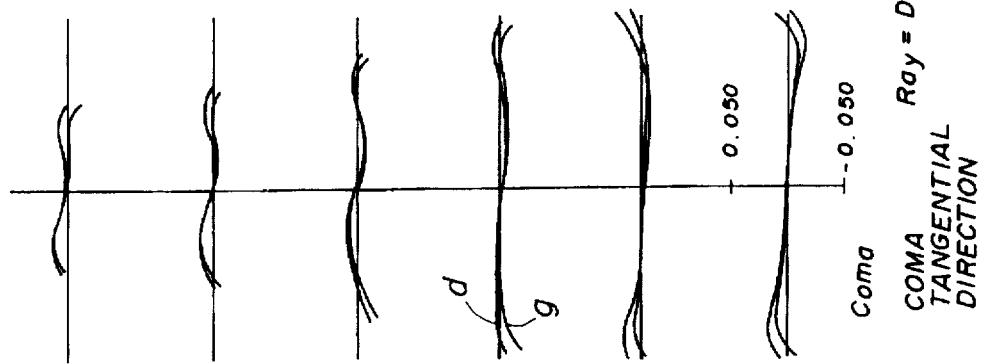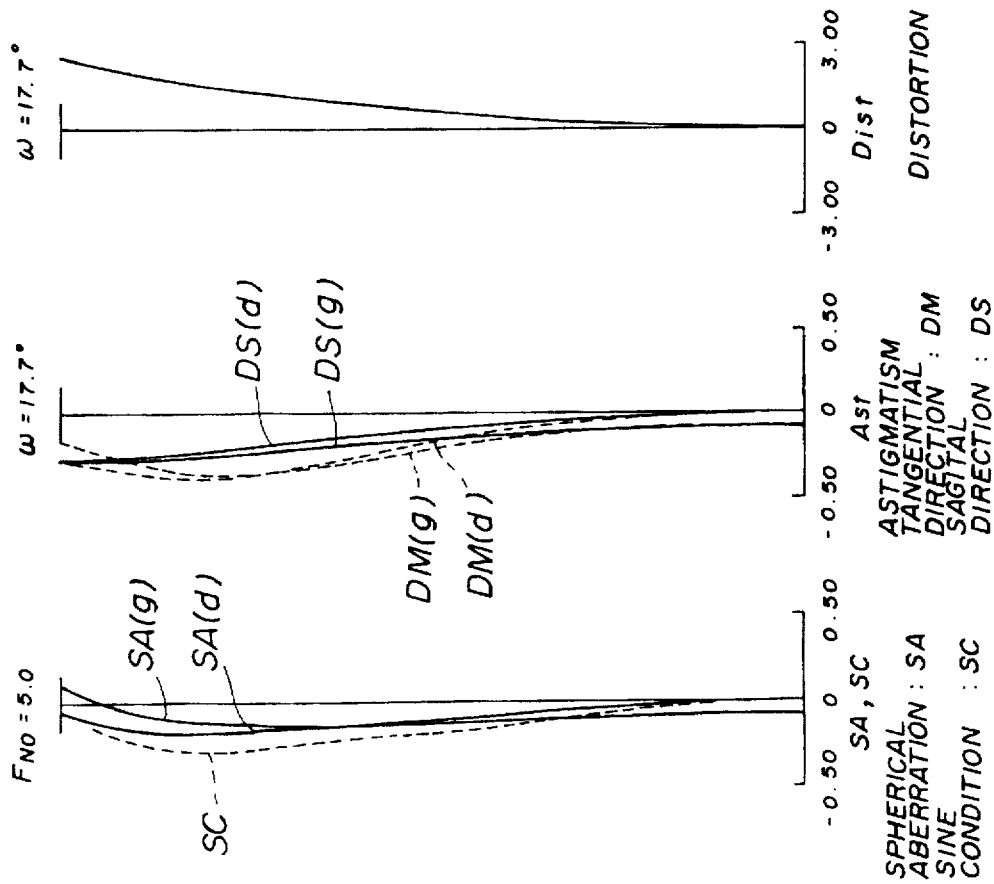

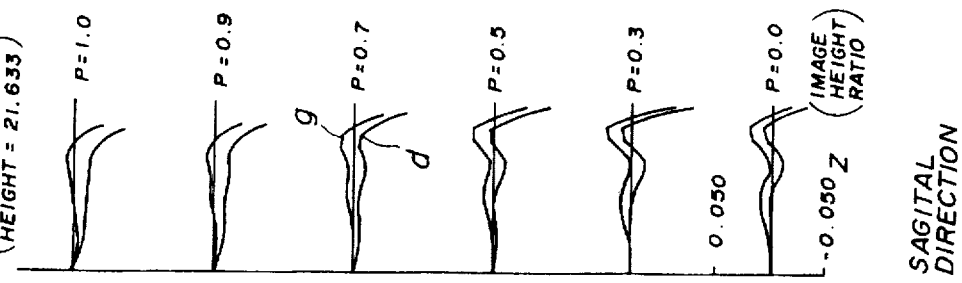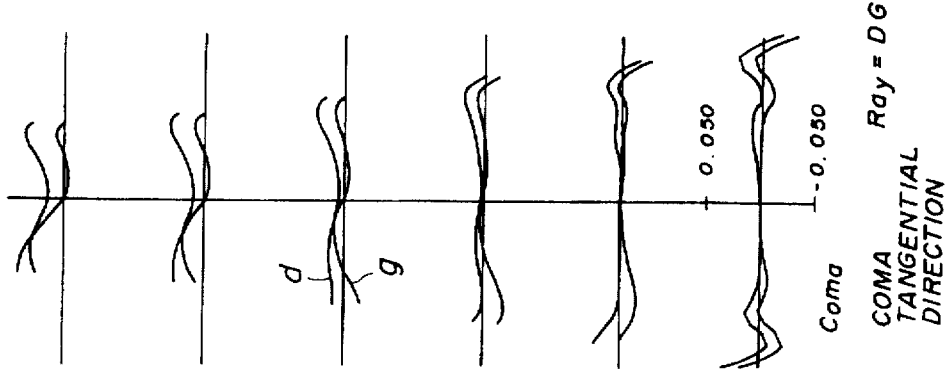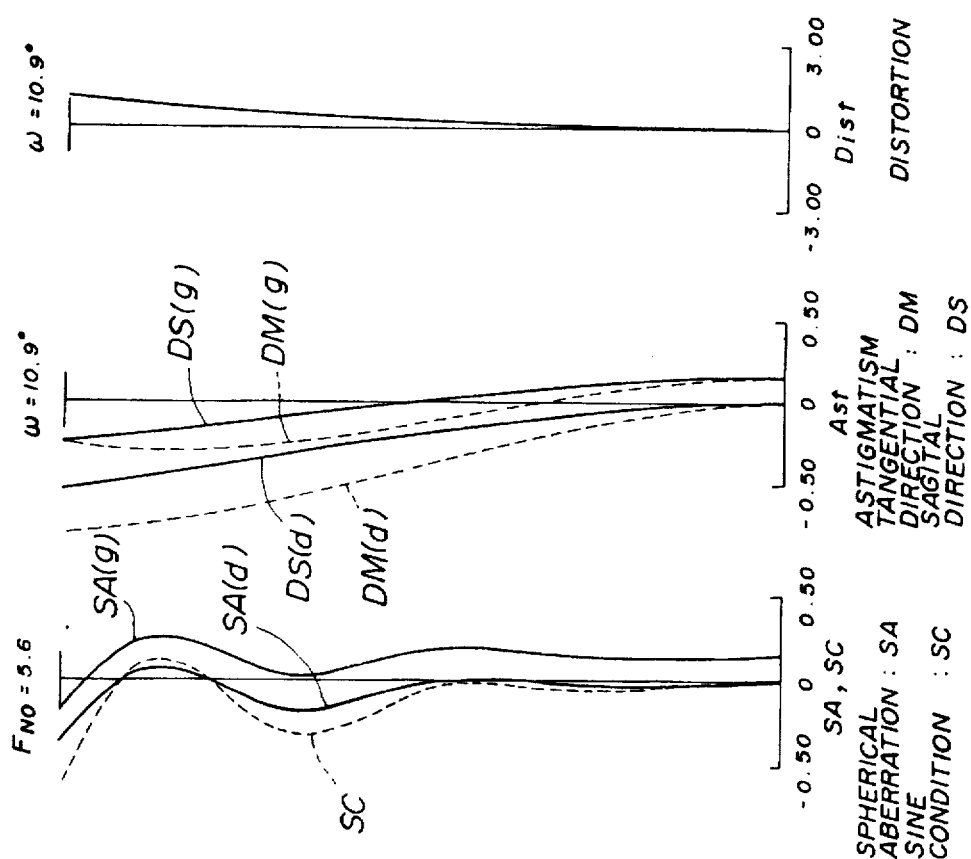

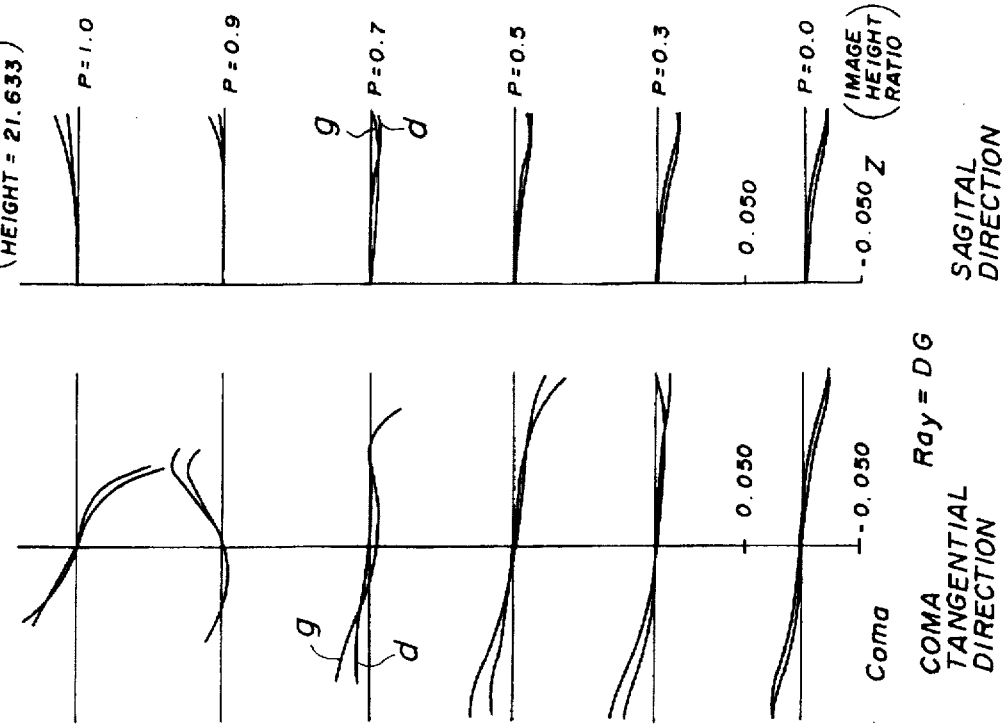
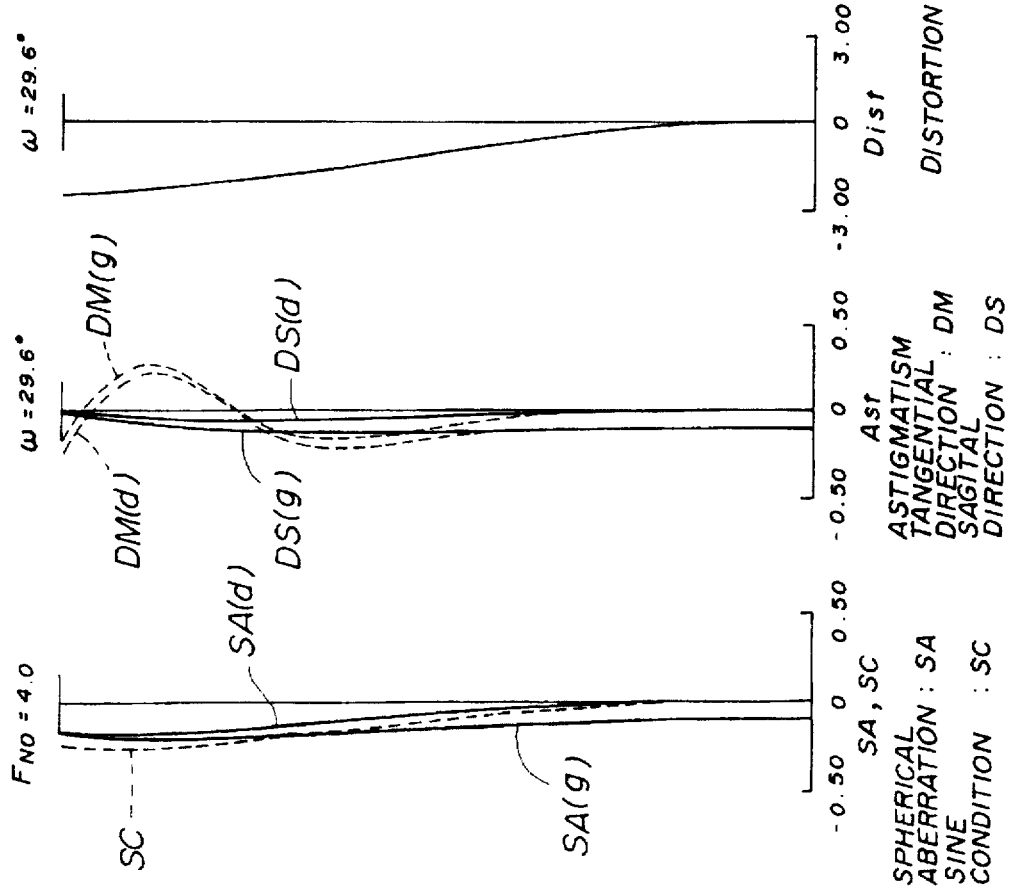

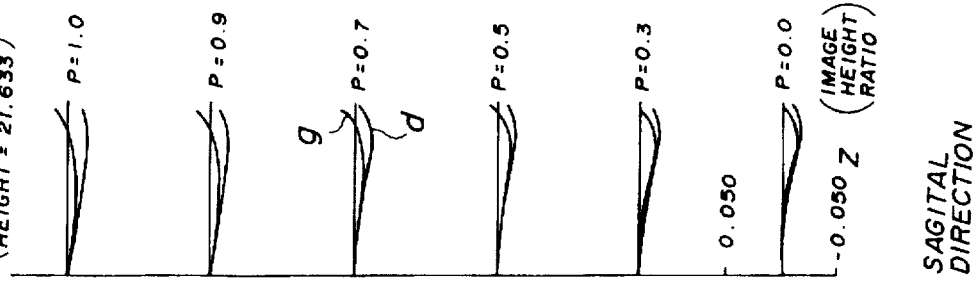
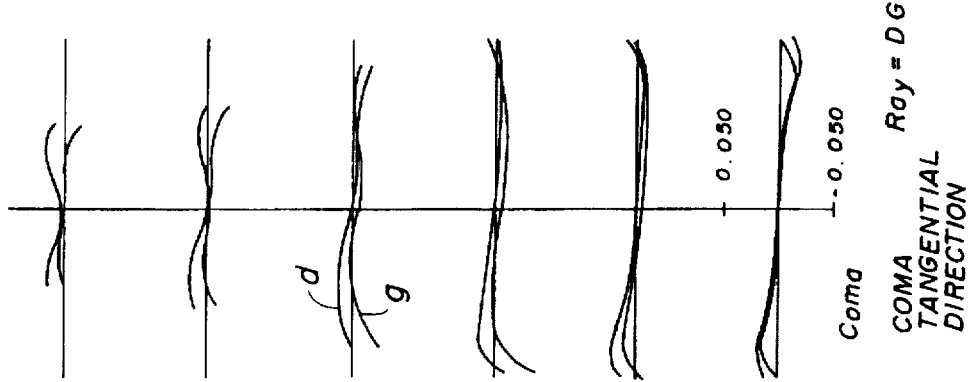
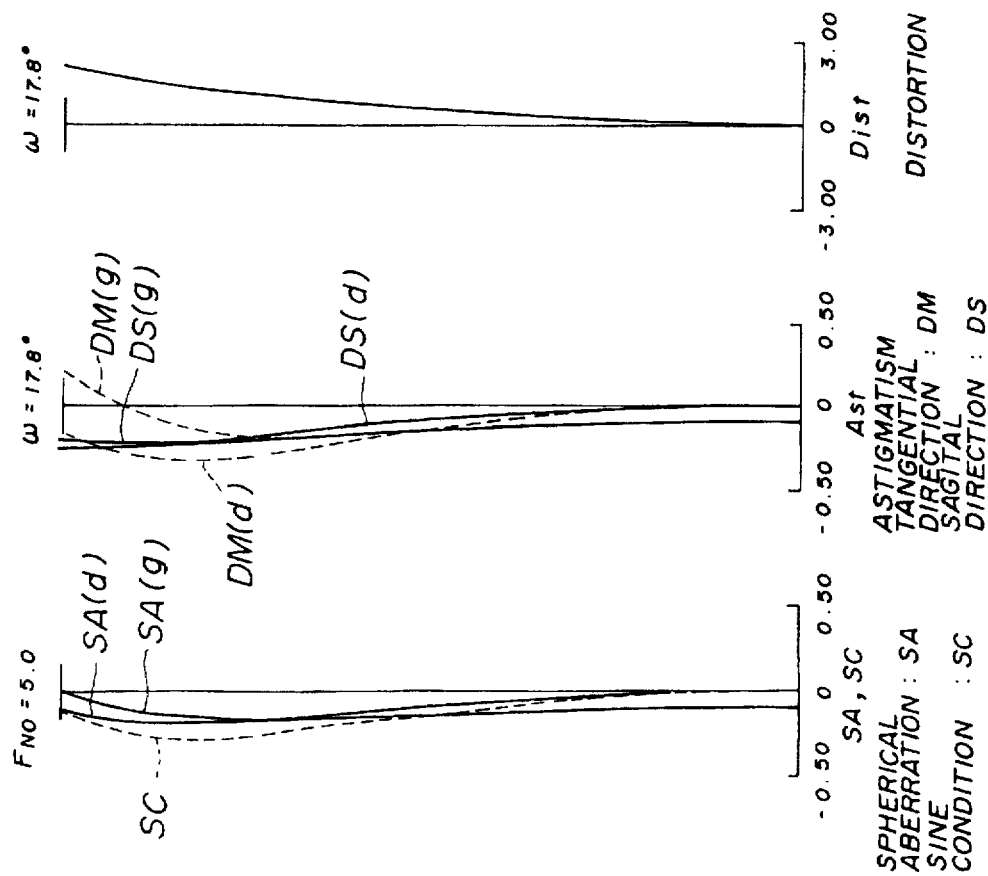

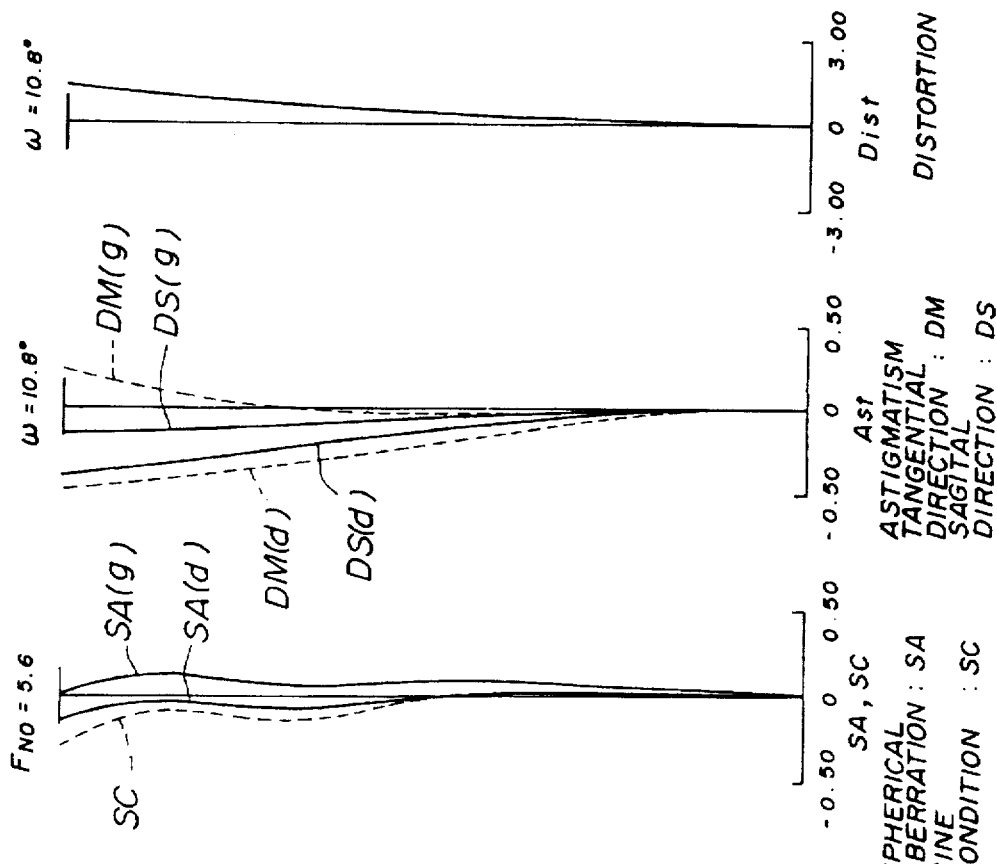

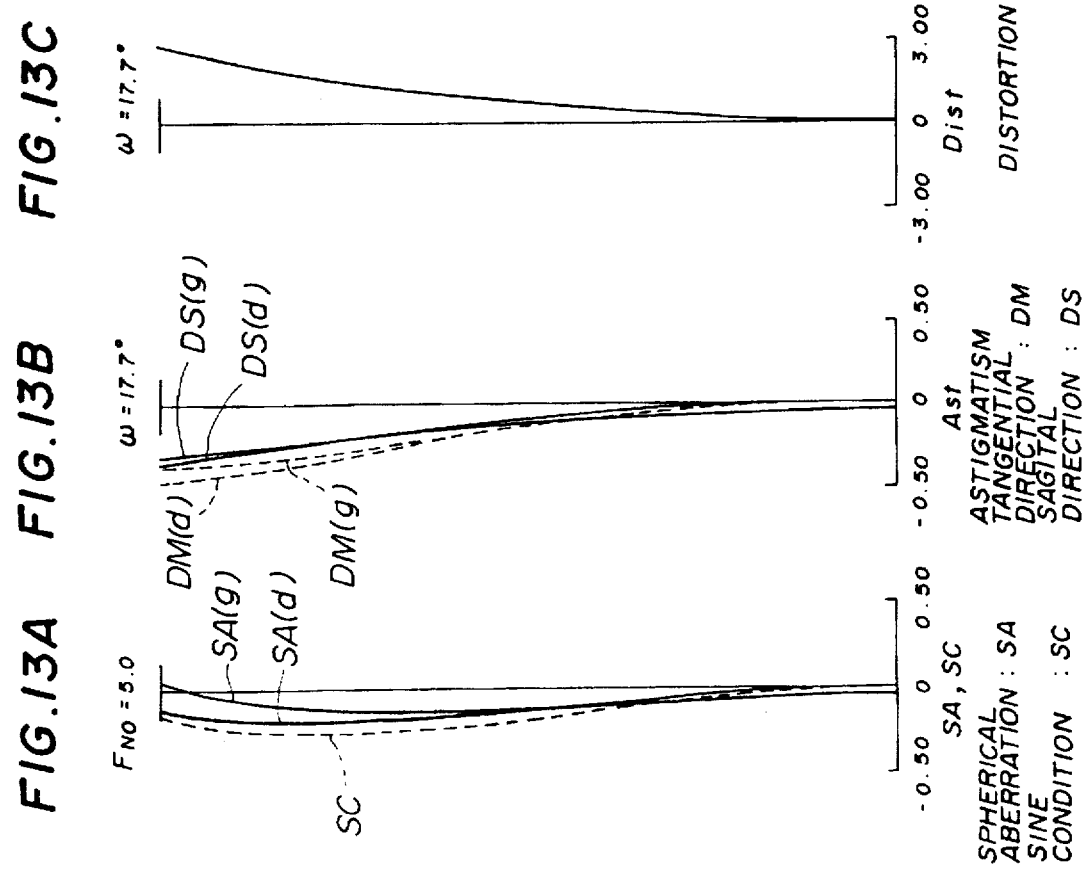

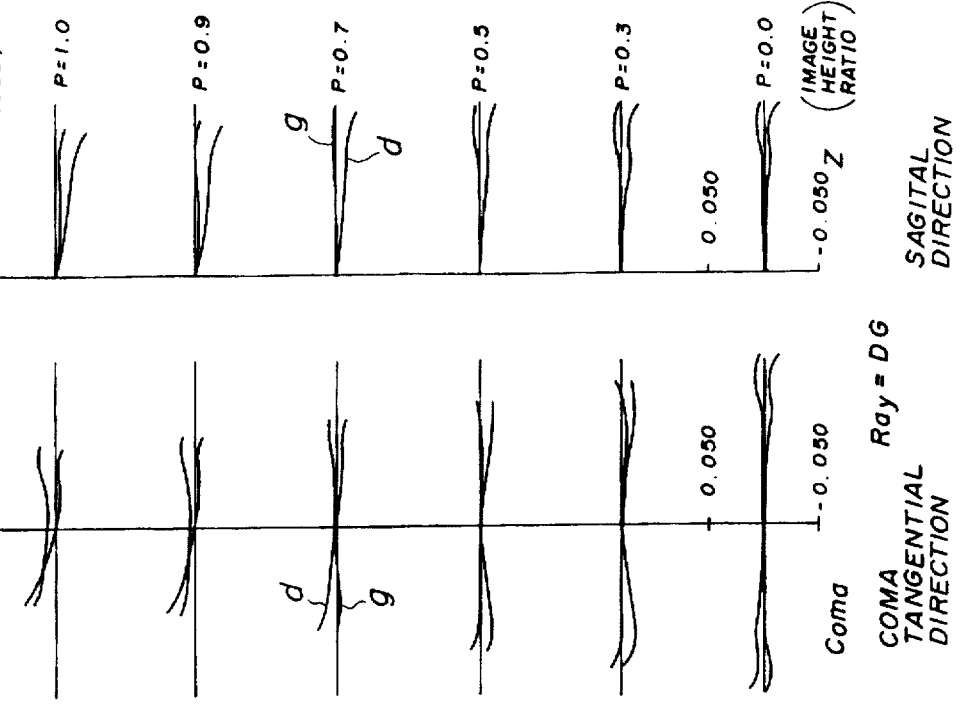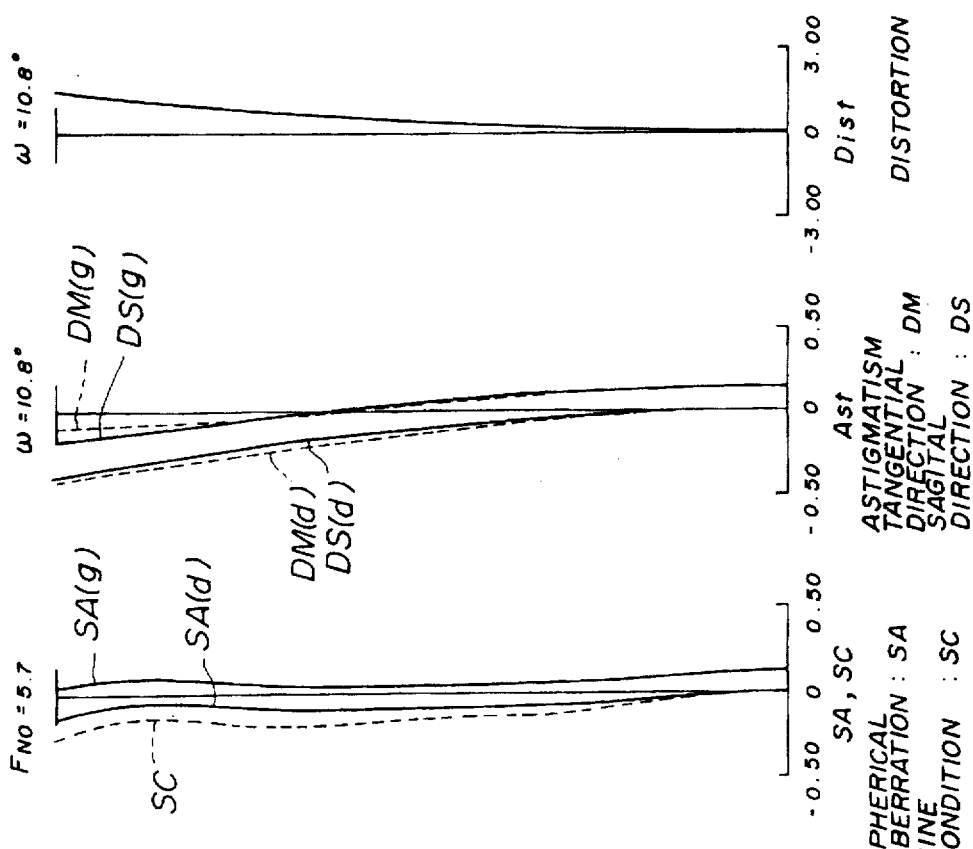

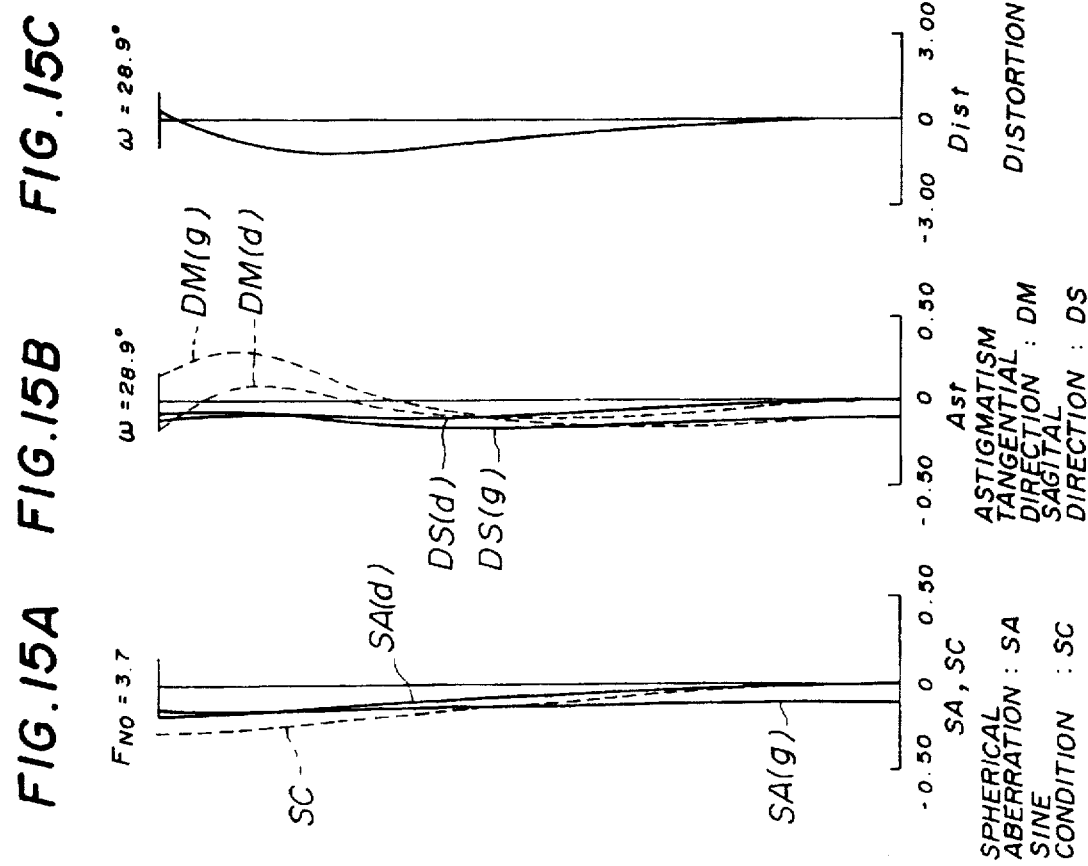

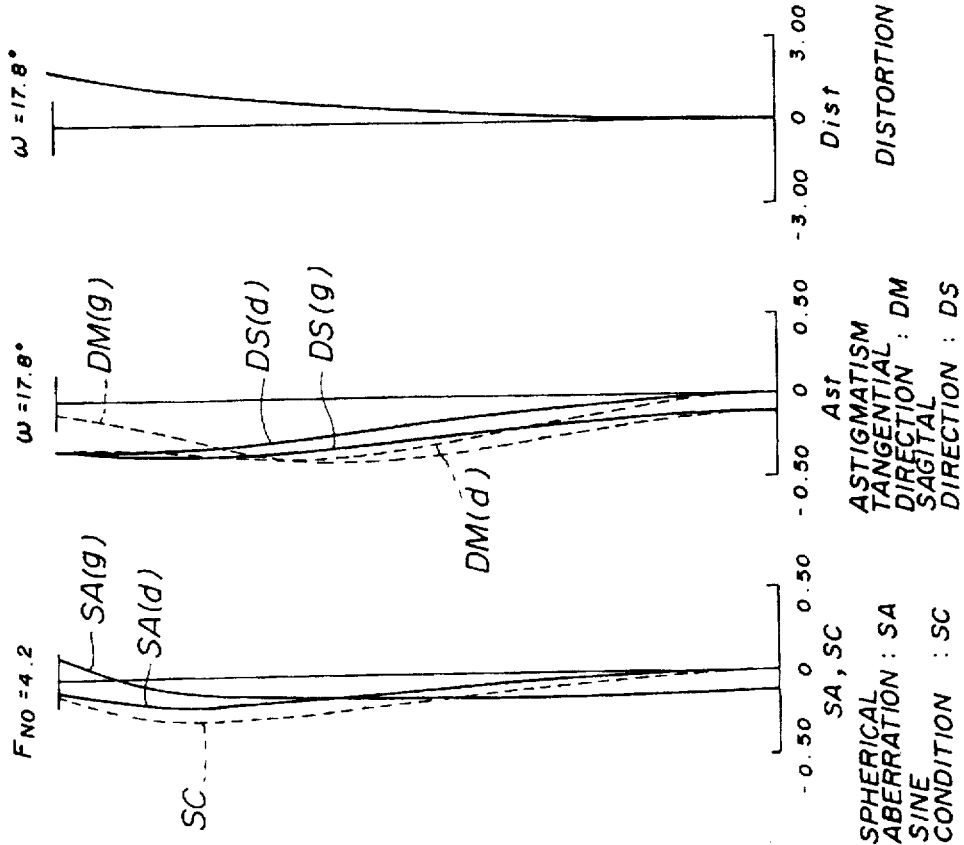

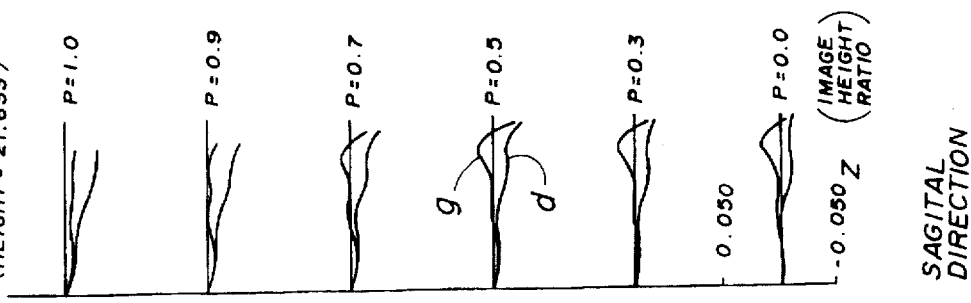
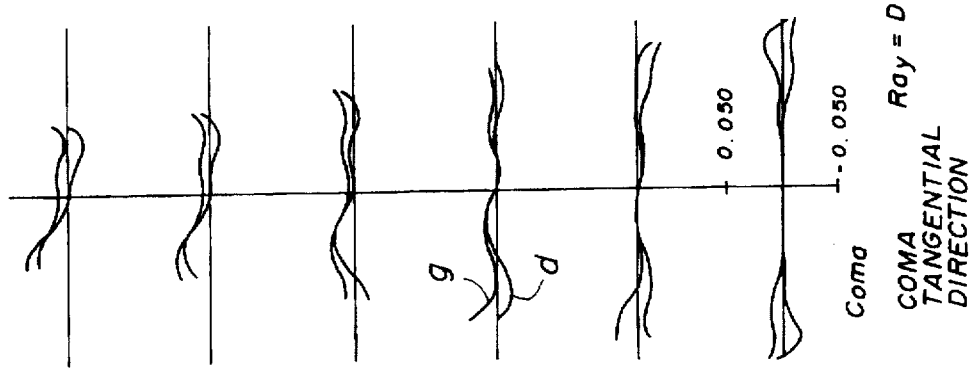
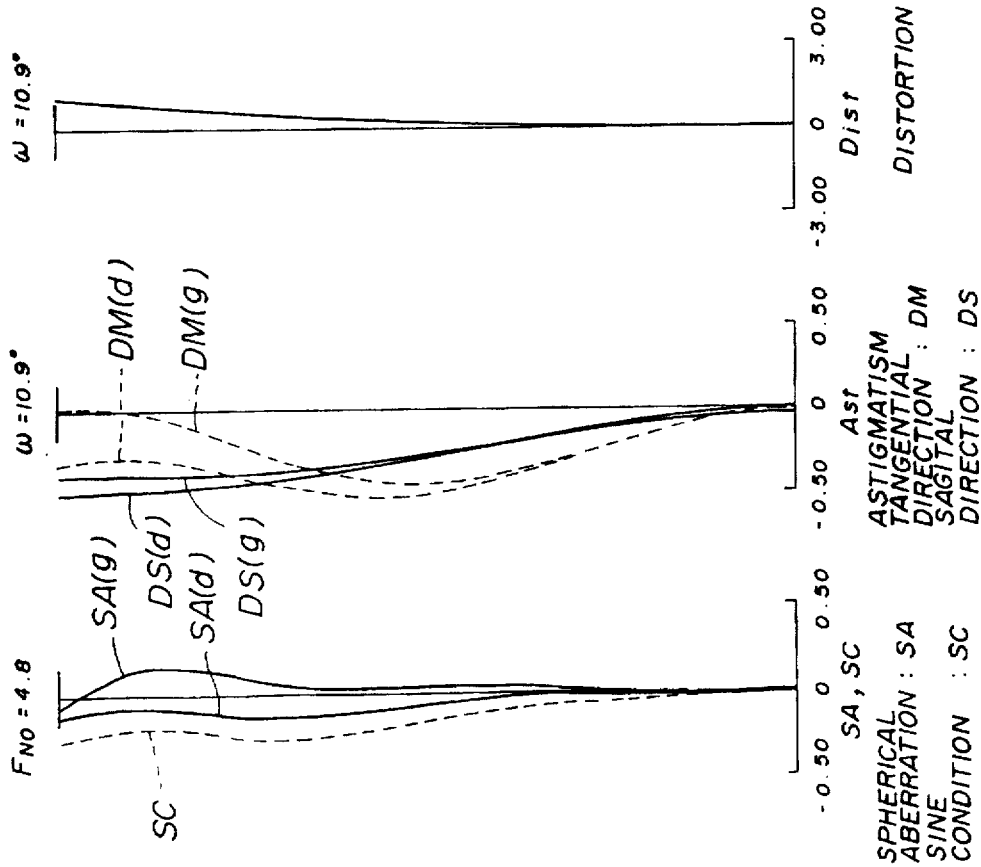

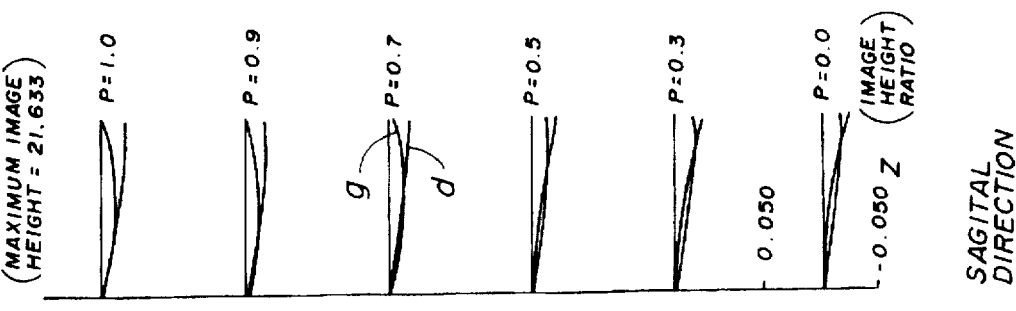
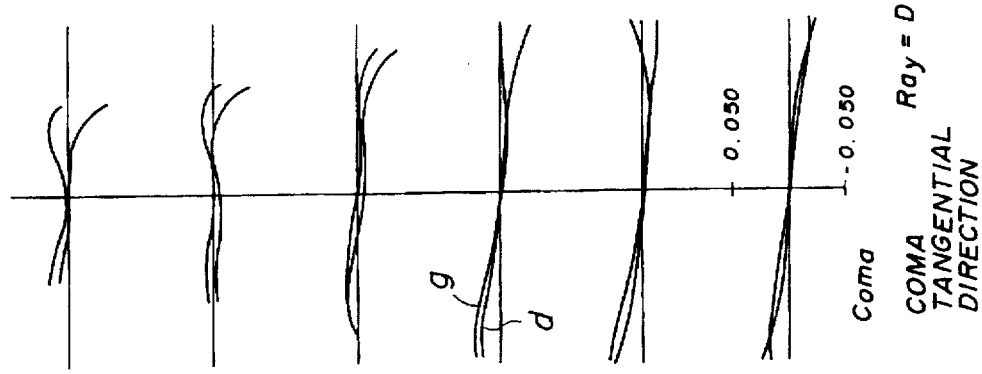
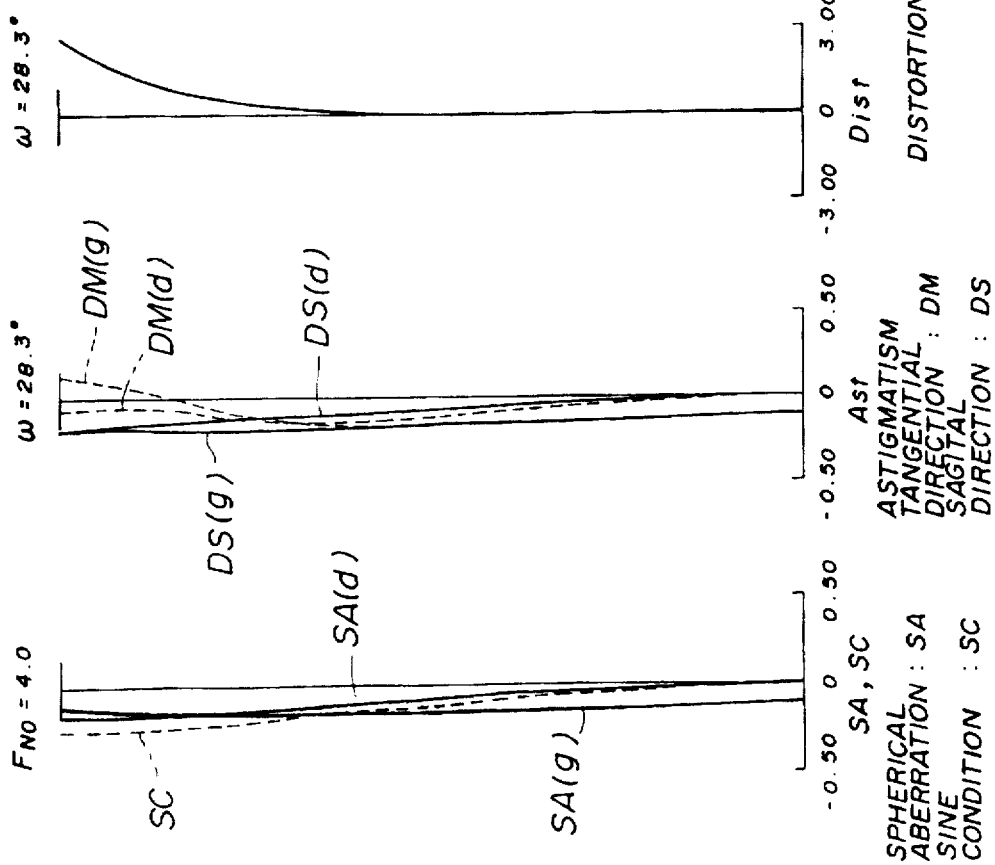

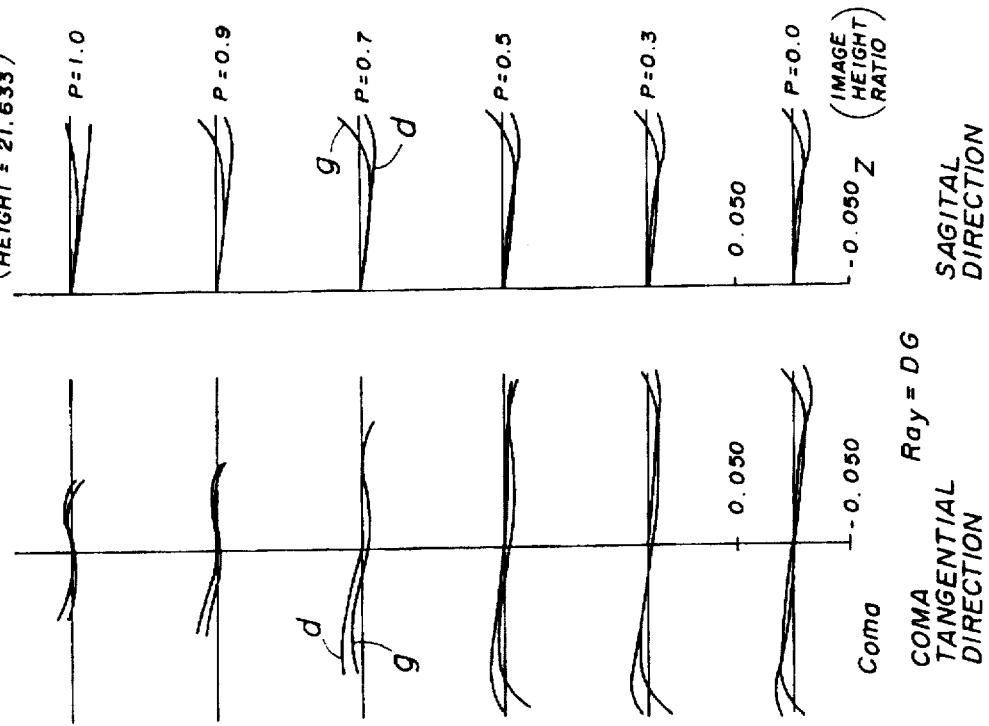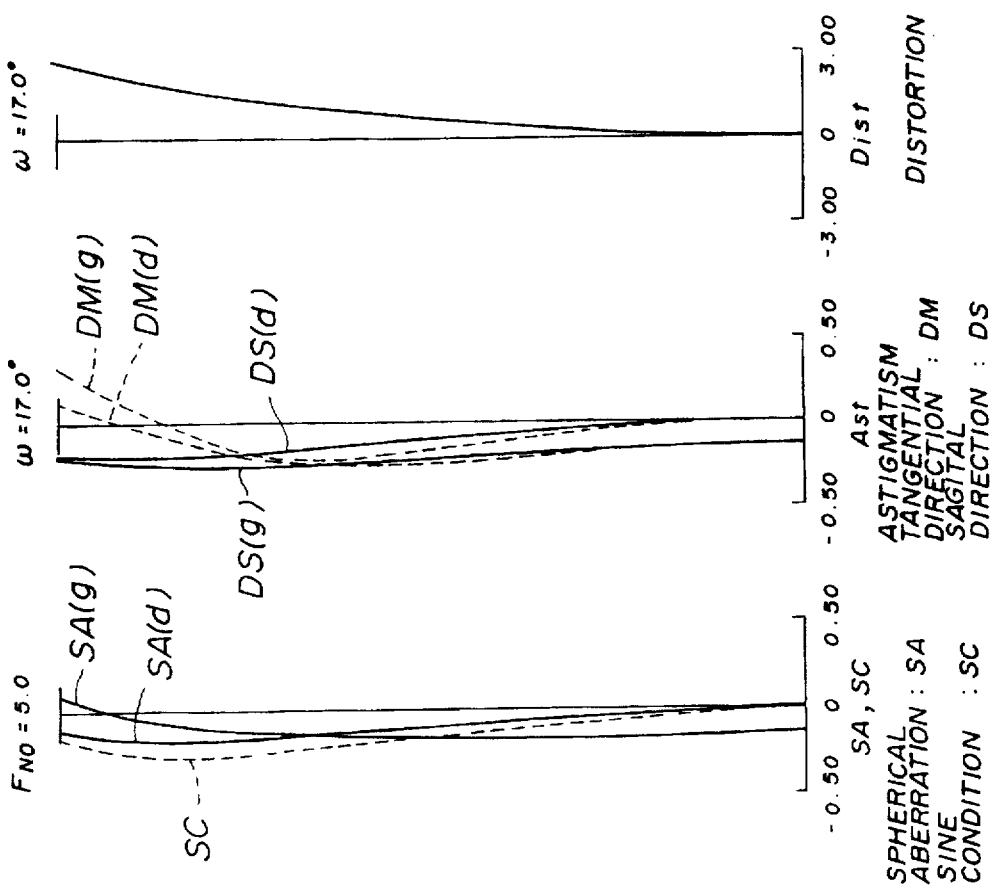

FIG.20A FIG.20B FIG.20C FIG.20D FIG.20E

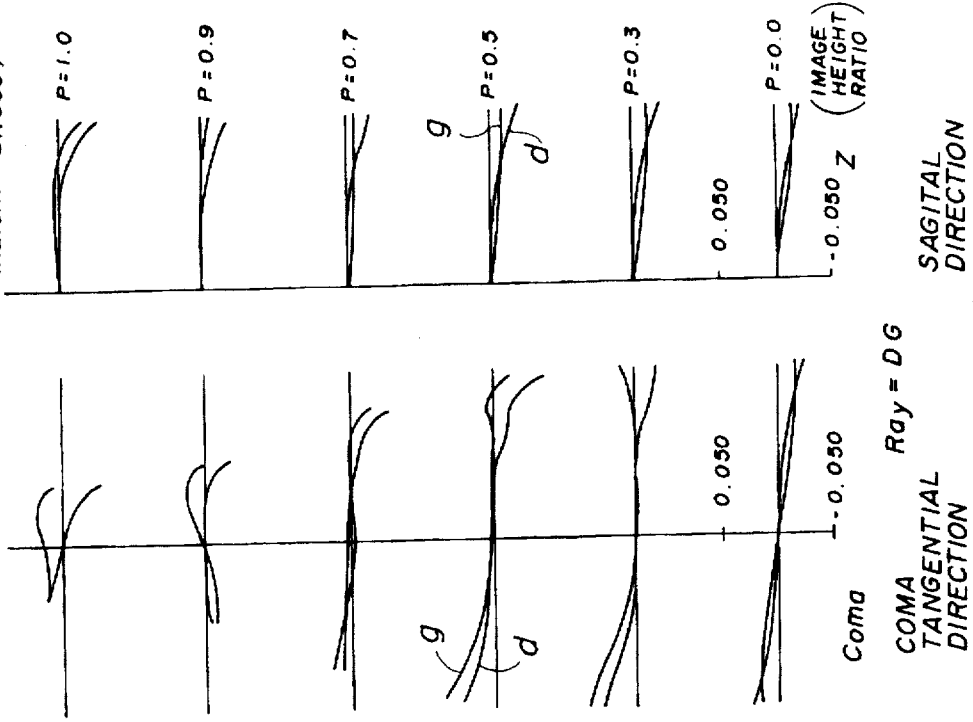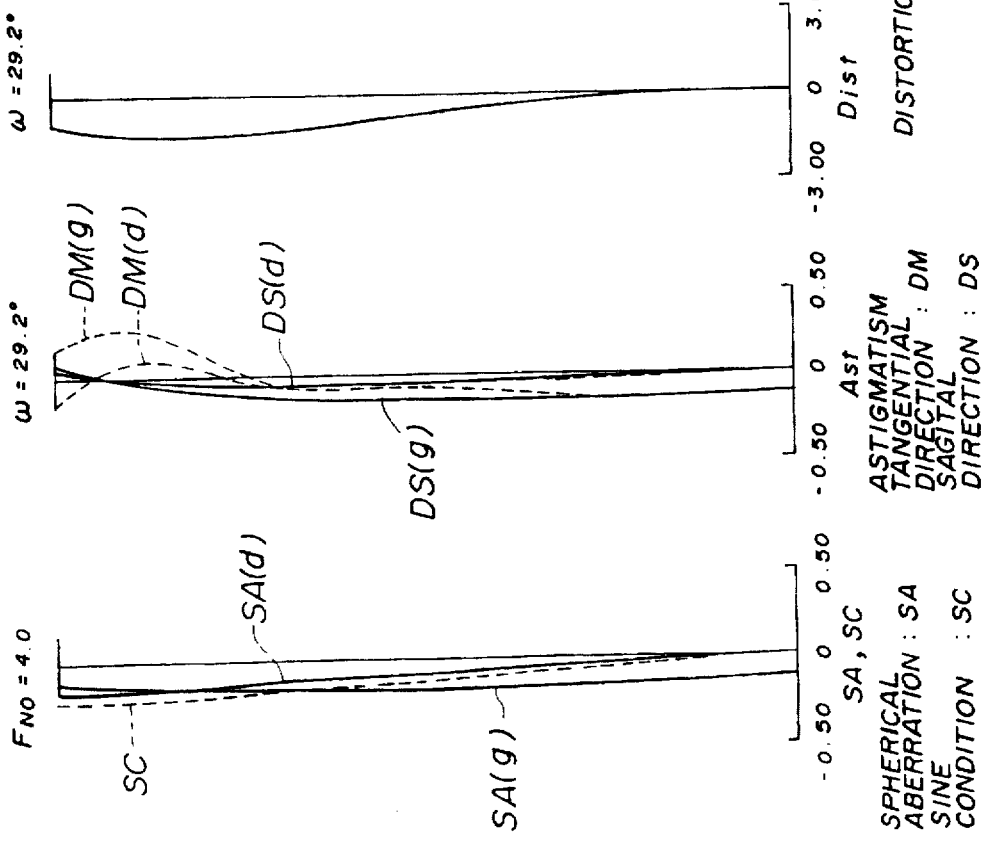

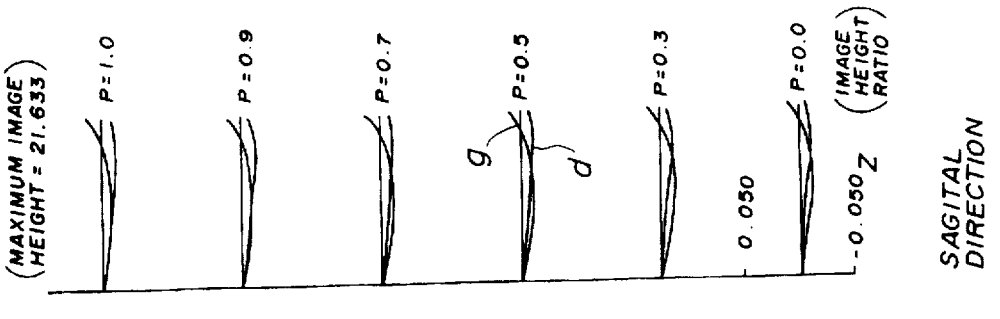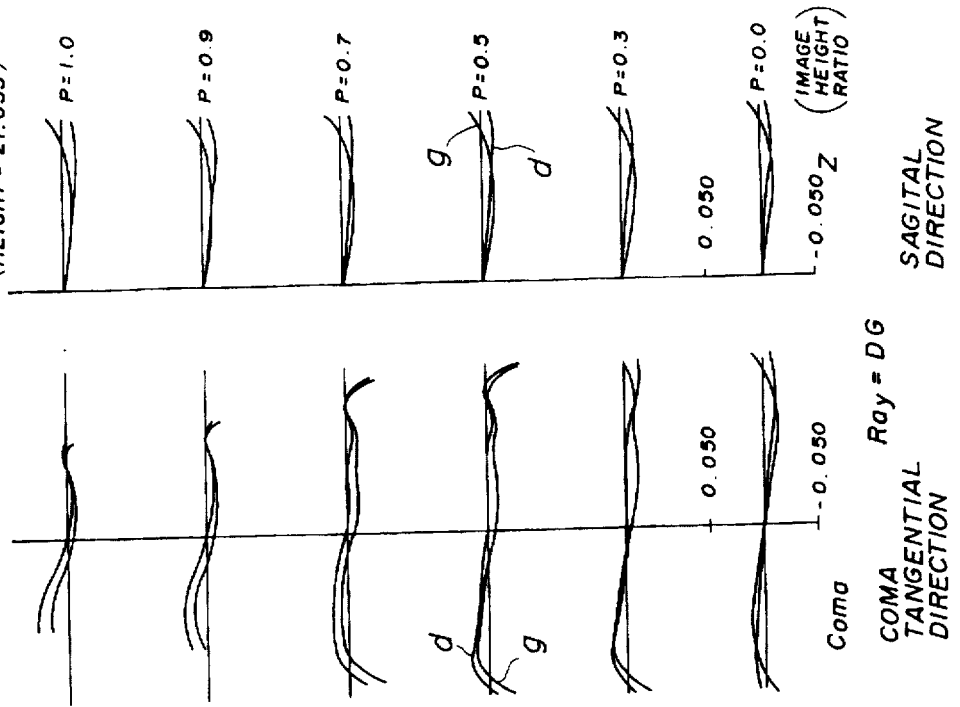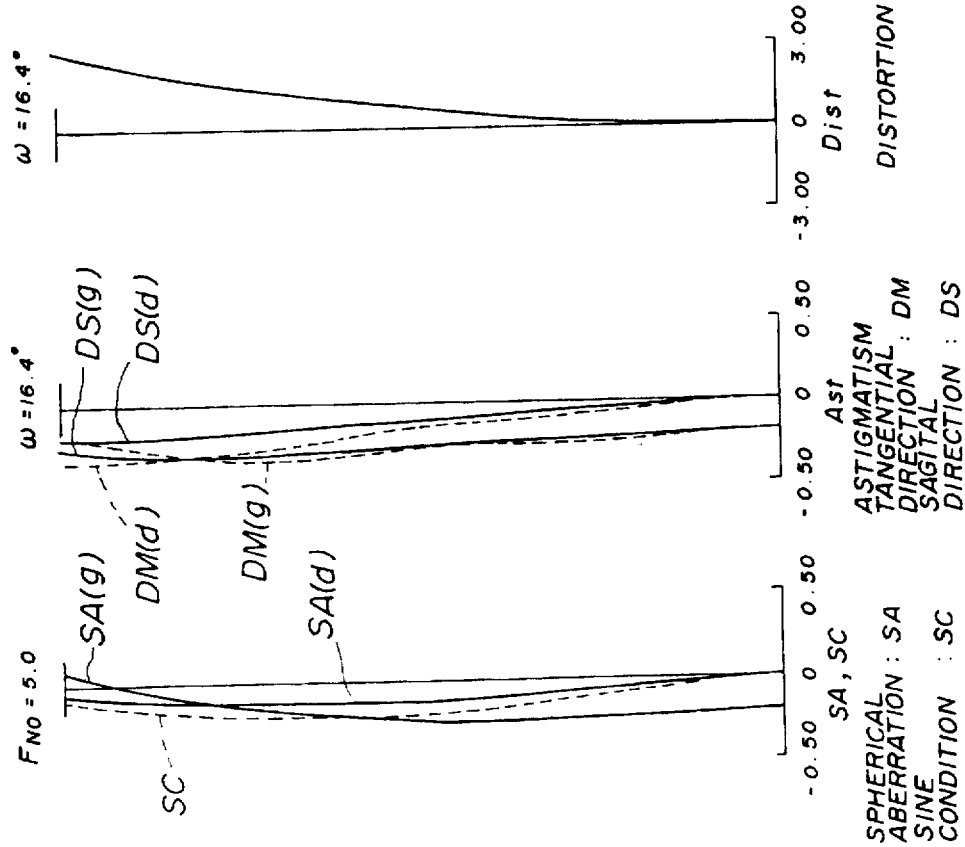

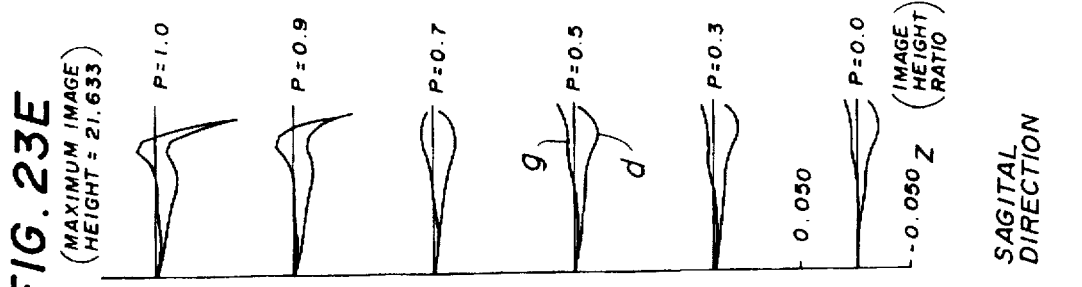
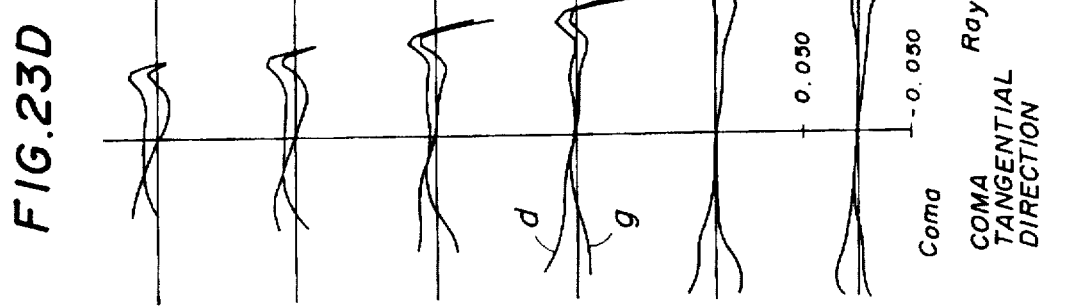
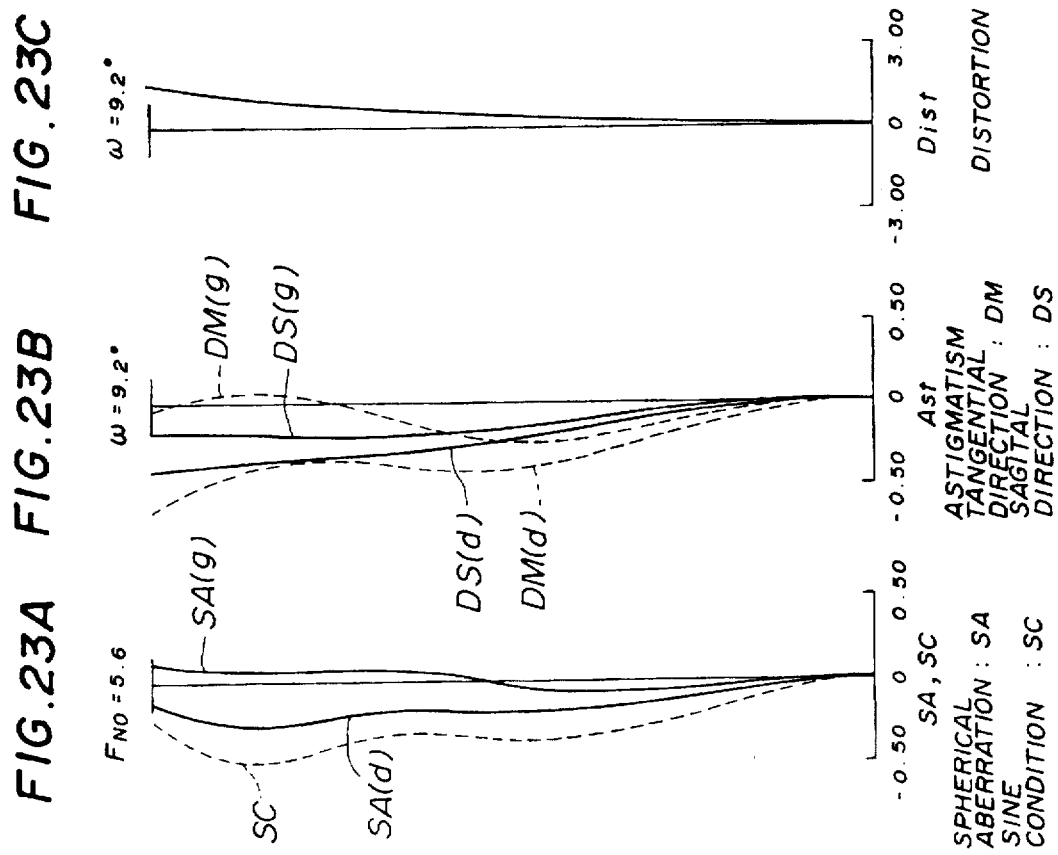

HIGH VARIABLE-POWER RATIO, HIGH APERTURE RATIO, ZOOM OPTICAL SYSTEM

BACKGROUND OF THE INVENTION

1. Field of the Invention

The present invention relates to improvements of a zoom optical system, and, in particular, to improvements of a zoom optical system when used in a lens shutter camera.

2. Description of the Related Art

For example, in a camera provided with a shutter inside a lens series thereof (simply referred to as 'lens shutter camera' or 'LS camera' in this specification), a reduction in the size of the entire camera including the photographing lenses is demanded. Furthermore, as a matter as important as the size reduction, high performance and low cost of the camera is also demanded. Especially, in the field of LS cameras, enhancement in zoom ratio or variable-power ratio is demanded. For this purpose, various high variable-power ratio, zoom optical systems for LS cameras have been provided.

For the purpose of achieving a high variable-power ratio in a zoom optical system, as disclosed in Japanese Laid-Open Patent Application No.6-265788, discloses that a type of optical system wherein four lens groups, i.e., a positive group, a negative group, a positive group and a negative group are arranged in the above-mentioned order from the object side is advantageous. For this reason, recently, there have been many zoom optical systems which use that type of optical system in high variable-power zoom optical systems.

For example, as three-class high variable-power zoom optical systems, each of the zoom optical systems disclosed in Japanese Laid-Open Patent Application Nos.2-207210 and 2-223908 achieves a variable-power ratio of 3.4 and an $F_{No.}$ of 8 (F8), the zoom optical system disclosed in Japanese Laid-Open Patent Application No.3-39920 achieves the variable-power ratio of 2.9 and an $F_{No.}$ of 8.5 (F8.5), the zoom optical system disclosed in Japanese Laid-Open Patent Application No.6-222267 achieves the variable-power ratio of 2.9 and an $F_{No.}$ of 8.2 (F8.2) and the zoom optical system disclosed in Japanese Laid-Open Patent Application No.6-265788 achieves the variable-power ratio of 5 and an $F_{No.}$ of 8.7 (F8.7). By variable power ratios having a three-class, it is understood that the variable power ratio is approximately 3, e.g., 2.8, 2.9, 3.0, 3.1, 3.2, etc.

However, each of almost all of the high variable-power ratio zoom optical systems having variable-power ratios of three-class in the related art has an $F_{No.}$ of 8 to 10 (F8 to F10), at an optical system formation for providing the telephoto-end focal length (this optical system formation will be simply referred to as 'telephoto-end formation', hereinafter), and thus has a low illumination level. In a case of photographing by using a telephoto-end formation in a zoom optical system having such a low-illumination-level telephoto-end formation $F_{No.}$, accidental camera movement, for example, as caused by hand movement, may cause a blur in a resultant photograph. Further, in the case of portrait photography, at a focal length of approximately 100 mm, effectively utilizing an 'out-of-focus effect' of the foreground and/or background, limitations on effective achievement of such photographic art may be quickly reached soon.

Those problems may be solved as a result of increasing the number of lenses and the number of aspherical surfaces in the optical system (lens system) and thus increasing the aperture ratio of the optical system. However, such an arrangement not only may degrade compactness of the optical system but also may have a very adverse effect on achieving improvement of manufacturing efficiency and cost reduction of those cameras.

Some high variable-power zoom optical systems are known wherein a high illumination level is provided even at a telephoto-end formation. For example, the zoom optical system disclosed in each of Japanese Laid-Open Patent Application Nos.1-252915 and 1-314219 achieves a variable-power ratio of 2.8 and $F_{No.}$ of 5.8 (F5.8).

However, in such a high variable-power ratio zoom optical system in the related art, the number of lenses constituting the optical system and the number of aspherical surfaces in the optical system are large, and, thus, high manufacturing efficiency, compactness and low cost of the camera can not be achieved.

Thus, in view of aspects of optical performance and cost reduction, the high variable-power optical systems in the related art have problems in achieving a high illumination level at a telephoto-end formation while providing low cost and miniaturized size of the optical system.

The 'high variable-power ratio zoom lens' disclosed in Japanese Laid-Open Patent Application No.6-265788 described above has four groups including 8 lenses wherein a positive group, a negative group, a positive group and a negative group are arranged in the above-mentioned order. Only with respect to the optical system configuration, the optical system in the related art is similar to the optical system according to the present invention. However, that optical system in the related art has an $F_{No.}$ of 8.7 (F8.7) and, thus, has a low illumination level at a telephoto-end formation. Further, that optical system in the related art has 6 or 7 aspherical surfaces and thus many aspherical surfaces. Therefore, that optical system in the related art cannot achieve those objects of the present invention.

SUMMARY OF THE INVENTION

The present invention has been devised in view of the above-described problems in the related art. A first object of the present invention is to provide a high variable-power ratio, high aperture ratio, zoom optical system which uses a type of optical system including four groups, has a variable-power ratio of 2.85 to 3.35, has a telephoto-end formation $F_{No.}$ of F4.8 to F5.6 and, thus, has a high illumination level. Further, with regard to the optical system configuration, the zoom optical system to be provided has only 8 lenses in the four groups, the number of lenses being the minimum number in the four-group zoom optical systems in the related art. Further, the number of aspherical surfaces in the zoom optical system to be provided is 2 to 4, and, thus, the zoom optical system can be simply configured. Further, the zoom optical system to be provided has, at an optical system formation for providing the wide-angle-end focal length (which optical system formation will be simply referred to as 'wide-angle-end formation', hereinafter), at an optical system formation for providing a middle focal length (which optical system formation will be simply referred to as 'middle formation', hereinafter) and at the telephoto-end formation, each of the aberrations, such as the spherical aberration, astigmatism, distortion, coma and the sine condition can be adequately compensated.

A second object of the present invention is to provide a high variable-power ratio, high aperture ratio, zoom optical system wherein a mechanism for performing zooming and focusing can be simplified, compactness of the optical system when the optical system is retracted in the camera can be easily improved, also manufacturing efficiency is improved and costs can be effectively reduced.

In order to achieve those objects, according to a first aspect of the present invention, a high variable-power ratio, high aperture ratio, zoom optical system for a lens shutter camera, comprises a first zoom lens group, a second zoom lens group, a third zoom lens group and a fourth zoom lens group arranged on an optical axis in that order from an object side;

wherein:

the first zoom lens group comprises a negative lens and a positive lens arranged in that order from the object side, the first zoom lens group having a positive focal length;

the second zoom lens group comprises a negative lens and a positive lens arranged from the object side in that order, the second zoom lens group having a negative focal length;

the third zoom lens group comprises a double concave lens and a double convex lens arranged in that order from the object side, the third zoom lens group having a positive focal length, the third zoom lens group being provided with a diaphragm;

the fourth zoom lens group comprises a positive lens and a negative lens arranged from the object side in that order, the fourth zoom lens group having a negative focal length;

wherein, when zooming is performed from a wide-angle-end formation to a telephoto-end formation, at least the first zoom lens group and the fourth zoom lens group move to the object side, an axial distance between the first lens group and the second lens group increasing and an axial distance between the third lens group and the fourth zoom lens group decreasing with the movement of both zoom lens groups;

wherein:

each of the third zoom lens group and the fourth zoom lens group includes at least one aspherical surface, and the following conditions are satisfied:

$$0.2 < |f_1/f_2| < 1.6; \tag{1}$$

$$0.15 < |f_3/f_T| < 0.35; \tag{2}$$

$$0.2 < |f_4/f_T| < 0.4; \text{ and} \tag{3}$$

$$1 < |R_a/R_b| < 6; \tag{4}$$

where:

$f_1$ represents the focal length of the first zoom lens group;

$f_2$ represents the focal length of the second zoom lens group;

$f_3$ represents the focal length of the third zoom lens group;

$f_4$ represents the focal length of the fourth zoom lens group;

$f_T$ represents the focal length of the overall optical system at the telephoto-end formation;

$R_a$ represents the radius of curvature or the radius of paraxial curvature of the object side lens face a of the fifth lens when counted from the object side; and $R_b$ represents the radius of curvature or the radius of paraxial curvature of the image side lens face b of the sixth lens when counted from the object side.

The present invention according to a second aspect of the present invention is the high variable-power ratio, high aperture ratio, zoom optical system, wherein:

each of the negative lens of the positive lens of the first zoom lens group comprises a meniscus lens having a convex face which faces the object side; and the following condition is satisfied:

$$15 < v_2 - v_1, \tag{5}$$

where:

$v_1$ represents the Abbe's number at the d-line of the lens, the first lens when counted from the object side; and $v_2$ represents the Abbe's number at the d-line of the positive lens, the second lens when counted from the object side.

The present invention according to the third aspect is the high variable-power ratio, high aperture ratio, zoom optical system, wherein the negative lens and the positive lens of the second zoom lens group are formed as a junction-type lens.

The present invention according to a fourth aspect is the high variable-power ratio, high aperture ratio, zoom optical system, wherein:

at least one face of the double-concave lens of the third zoom lens group is an aspherical surface having a shape such that the diverging power of the lens becomes stronger at a position of the lens which approaches the lens periphery; and the following condition is fulfilled:

$$25 < v_6 - v_5, \tag{6}$$

where:

$v_5$ represents the Abbe's number at the d-line of the double concave lens, which is the fifth lens when counted from the object side; and $v_6$ represents the Abbe's number at the d-line of the double-convex lens of the third zoom lens group, which is the sixth lens when counted from the object side.

The present invention according to a fifth aspect is the high variable-power ratio, high aperture ratio, zoom optical system, wherein:

at least one face of the positive lens of the fourth zoom lens group is an aspherical surface having a shape such that the converging power of the lens becomes stronger at a position of the lens which approaches the lens periphery; and the following condition is fulfilled:

$$15 < v_8 - v_7, \tag{6}$$

where:

$v_7$ represents the Abbe's number at the d-line of the positive concave lens, which is the seventh lens when counted from the object side; and $v_8$ represents the Abbe's number at the d-line of the negative lens of the fourth zoom lens group, which is the lens located closest to the image side.

The present invention according to a sixth aspect is the high variable-power ratio, high aperture ratio, zoom optical system, wherein, when zooming, the first zoom lens group and the fourth zoom lens group move equally so that an axial distance between the lens closest to the object side (first lens) and the lens closest to the image side (eighth lens) may be maintained at a fixed value.

The present invention according to a seventh aspect is the high variable-power ratio, high aperture ratio, zoom optical system, wherein:

short distance focusing is performed by moving the fourth zoom lens group toward the image side; and the following condition is satisfied:

$$1 < (\beta_{4w}^2 - 1) f_T / f_W < 3, \qquad (8)$$

where:

$\beta_{4w}$ represents the image magnification of the fourth zoom lens group at the wide-angle-end formation; and $f_W$ represents the focal length of the overall optical system at the wide-angle-end formation.

The present invention according to an eighth aspect is the high variable-power ratio, high aperture ratio, zoom optical system, wherein short distance focusing is performed by moving the third zoom lens group toward the object side.

The present invention according to a ninth aspect is the high variable-power ratio, high aperture ratio, zoom optical system, wherein:

the diaphragm provided with the third zoom lens group is provided at the object side of the third zoom lens group; and the diaphragm moves integrally with the third zoom lens group when zooming and when focusing.

The present invention according to a tenth aspect is the high variable-power ratio, high aperture ratio, zoom optical system, wherein:

the diaphragm provided with the third zoom lens group is provided at the object side of the third zoom lens group;

the diaphragm moves integrally with the third zoom lens group when zooming; and the third zoom lens group moves toward the diaphragm which is fixed, when focusing.

The high variable-power ratio, high aperture ratio, zoom optical system according to the present invention, when configured as discussed above, uses a simple optical system type configuration including the four groups, eight lenses, in which the positive lens group, negative lens group, positive lens group and negative lens group are arranged in that order from the object side. Furthermore, the number of aspherical surfaces to be used is only two to four. Then, appropriate conditions are set on the particular lens groups and the particular lenses as necessary. Thereby, a zoom optical system is provided having a variable-power ratio of 2.85 to 3.35, a telephoto-end formation $F_{No}$ of F4.5 to F5.6, and, thus, having a high illumination level. The aberrations, that is, the spherical aberration, astigmatism, distortion, coma, and the sine condition at the wide-angle-end formation, middle formation and telephoto-end formation are adequately compensated.

In the high variable-power ratio, high aperture ratio, zoom optical system according to the present invention, the total number of lenses to be used therein is the minimum of the similar optical systems of the related art. Further, the number of aspherical surfaces is smaller than that in the similar optical systems in the related art. Thus, it is also possible to simplify the overall optical system, provide for cost reduction of the optical system and improve manufacturing efficiency of the optical system. Furthermore, the zooming mechanism and the focusing mechanism can be simplified, and also, compactness when the optical system is retracted into the camera.

Other objects and further features of the present invention will become more apparent from the following detailed description when read in conjunction with the accompanying drawings.

BRIEF DESCRIPTION OF THE DRAWINGS

FIGS. 3A, 3B, 3C, 3D and 3E show aberration curves of the spherical aberration, astigmatism, distortion, coma and sine condition of a high variable-power ratio, high aperture ratio, zoom optical system in a first embodiment of the present invention using the optical system configuration example shown in FIGS. 1A–1C, FIGS. 3A, 3B, 3C, 3D and 3E showing the aberrations when the high aperture ratio zoom optical system in the first embodiment is at the wide-angle-end formation as shown in FIG. 1A;

FIGS. 4A, 4B, 4C, 4D and 4E show aberration curves of the spherical aberration, astigmatism, distortion, coma and sine condition of the high variable-power ratio, high aperture ratio, zoom optical system in the first embodiment when the high aperture ratio zoom optical system in the first embodiment is at the middle formation as shown in FIG. 1B;

FIGS. 5A, 5B, 5C, 5D and 5E show aberration curves of the spherical aberration, astigmatism, distortion, coma and sine condition of the high variable-power ratio, high aperture ratio, zoom optical system in the first embodiment when the high aperture ratio zoom optical system in the first embodiment is at the telephoto-end formation as shown in FIG. 1C;

FIGS. 6A, 6B, 6C, 6D and 6E show aberration curves of the spherical aberration, astigmatism, distortion, coma and sine condition of a high variable-power ratio, high aperture ratio, zoom optical system in a second embodiment of the present invention using the optical system configuration example shown in FIGS.1A–1C, FIGS.6A, 6B, 6C, 6D and 6E showing the aberrations when the high aperture ratio zoom optical system in the second embodiment is at the wide-angle-end formation as shown in FIG. 1A;

FIGS.7A, 7B, 7C, 7D and 7E show aberration curves of the spherical aberration, astigmatism, distortion, coma and sine condition of the high variable-power ratio, high aperture ratio, zoom optical system in the second embodiment when the high aperture ratio zoom optical system in the second embodiment is at the middle formation as shown in FIG. 1B;

FIGS.8A, 8B, 8C, 8D and 8E show aberration curves of the spherical aberration, astigmatism, distortion, coma and sine condition of the high variable-power ratio, high aperture ratio, zoom optical system in the second embodiment when the high aperture ratio zoom optical system in the second embodiment is at the telephoto-end formation as shown in FIG. 1C;

FIGS. 9A, 9B, 9C, 9D and 9E show aberration curves of the spherical aberration, astigmatism, distortion, coma and sine condition of a high variable-power ratio, high aperture ratio, zoom optical system in a third embodiment of the present invention using the optical system configuration example shown in FIGS. 1A–1C, FIGS. 9A, 9B, 9C, 9D and 9E showing the aberrations when the high aperture ratio zoom optical system in the third embodiment is at the wide-angle-end formation as shown in FIG. 1A;

FIGS. 10A, 10B, 10C, 10D and 10E show aberration curves of the spherical aberration, astigmatism, distortion, coma and sine condition of the high variable-power ratio, high aperture ratio, zoom optical system in the third embodiment when the high aperture ratio zoom optical system in the third embodiment is at the middle formation as shown in FIG. 1B;

FIGS. 11A, 11B, 11C, 11D and 11E show aberration curves of the spherical aberration, astigmatism, distortion, coma and sine condition of the high variable-power ratio, high aperture ratio, zoom optical system in the third embodiment when the high aperture ratio zoom optical system in the third embodiment is at the telephoto-end formation as shown in FIG. 1C;

FIGS. 13A, 13B, 13C, 13D and 13E show aberration curves of the spherical aberration, astigmatism, distortion, coma and sine condition of the high variable-power ratio, high aperture ratio, zoom optical system in the fourth embodiment when the high aperture ratio zoom optical system in the fourth embodiment is at the middle formation as shown in FIG. 1B;

FIGS. 14A, 14B, 14C, 14D and 14E show aberration curves of the spherical aberration, astigmatism, distortion, coma and sine condition of the high variable-power ratio, high aperture ratio, zoom optical system in the fourth embodiment when the high aperture ratio zoom optical system in the fourth embodiment is at the telephoto-end formation as shown in FIG. 1C;

FIGS. 15A, 15B, 15C, 15D and 15E show aberration curves of the spherical aberration, astigmatism, distortion, coma and sine condition of a high variable-power ratio, high aperture ratio, zoom optical system in a fifth embodiment of the present invention using the optical system configuration example shown in FIGS. 1A–1C, FIGS. 15A, 15B, 15C, 15D and 15E showing the aberrations when the high aperture ratio zoom optical system in the fifth embodiment is at the wide-angle-end formation as shown in FIG. 1A;

FIGS. 16A, 16B, 16C, 16D and 16E show aberration curves of the spherical aberration, astigmatism, distortion, coma and sine condition of the high variable-power ratio, high aperture ratio, zoom optical system in the fifth embodiment when the high aperture ratio zoom optical system in the fifth embodiment is at the middle formation as shown in FIG. 1B;

FIGS. 17A, 17B, 17C, 17D and 17E show aberration curves of the spherical aberration, astigmatism, distortion, coma and sine condition of the high variable-power ratio, high aperture ratio, zoom optical system in the fifth embodiment when the high aperture ratio zoom optical system in the fifth embodiment is at the telephoto-end formation as shown in FIG. 1C;

FIGS. 18A, 18B, 18C, 18D and 18E show aberration curves of the spherical aberration, astigmatism, distortion, coma and sine condition of a high variable-power ratio, high aperture ratio, zoom optical system in a sixth embodiment of the present invention using the optical system configuration example shown in FIGS. 2A–2C, FIGS. 18A, 18B, 18C, 18D and 18E showing the aberrations when the high aperture ratio zoom optical system in the sixth embodiment is at the wide-angle-end formation as shown in FIG. 2A;

FIGS. 19A, 19B, 19C, 19D and 19E show aberration curves of the spherical aberration, astigmatism, distortion, coma and sine condition of the high variable-power ratio, high aperture ratio, zoom optical system in the sixth embodiment when the high aperture ratio zoom optical system in the sixth embodiment is at the middle formation as shown in FIG. 2B;

Figures 20A, 20B, 20C, 20D, 20E:
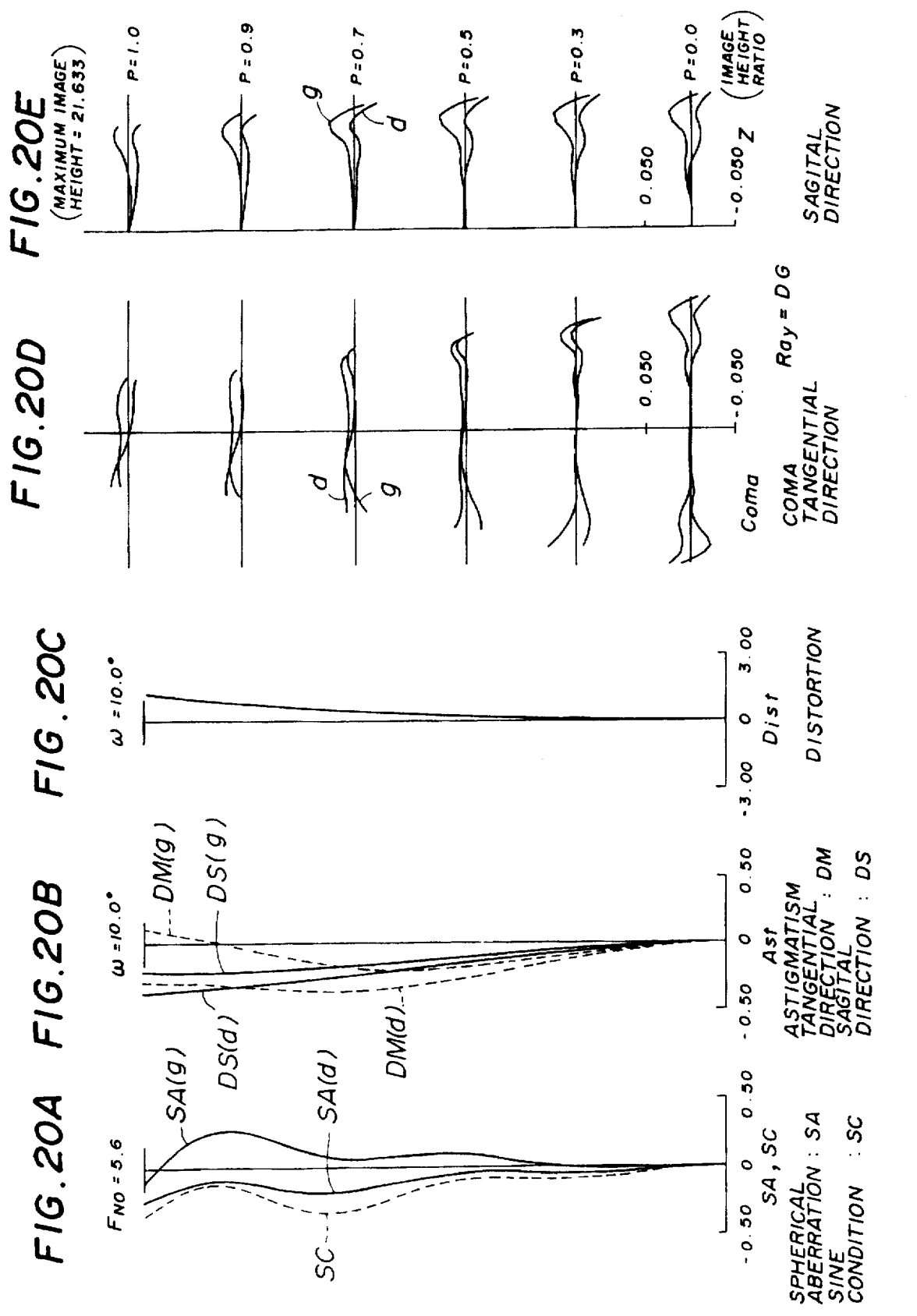

FIGS. 20A, 20B, 20C, 20D and 20E show aberration curves of the spherical aberration, astigmatism, distortion, coma and sine condition of the high variable-power ratio, high aperture ratio, zoom optical system in the sixth embodiment when the high aperture ratio zoom optical system in the sixth embodiment is at the telephoto-end formation as shown in FIG. 2C;

FIGS. 21A, 21B, 21C, 21D and 21E show aberration curves of the spherical aberration, astigmatism, distortion, coma and sine condition of a high variable-power ratio, high aperture ratio, zoom optical system in a seventh embodiment of the present invention using the optical system configuration example shown in FIGS. 2A–2C, FIGS. 21A, 21B, 21C, 21D and 21E showing the aberrations when the high aperture ratio zoom optical system in the seventh embodiment is at the wide-angle-end formation as shown in FIG. 2A;

FIGS. 22A, 22B, 22C, 22D and 22E show aberration curves of the spherical aberration, astigmatism, distortion, coma and sine condition of the high variable-power ratio, high aperture ratio, zoom optical system in the seventh embodiment when the high aperture ratio zoom optical system in the seventh embodiment is at the middle formation as shown in FIG. 2B; and FIGS. 23A, 23B, 23C, 23D and 23E show aberration curves of the spherical aberration, astigmatism, distortion, coma and sine condition of the high variable-power ratio, high aperture ratio, zoom optical system in the seventh embodiment when the high aperture ratio zoom optical system in the seventh embodiment is at the telephoto-end formation as shown in FIG. 2C.

DETAILED DESCRIPTION OF THE PREFERRED EMBODIMENTS

Figure 1A:
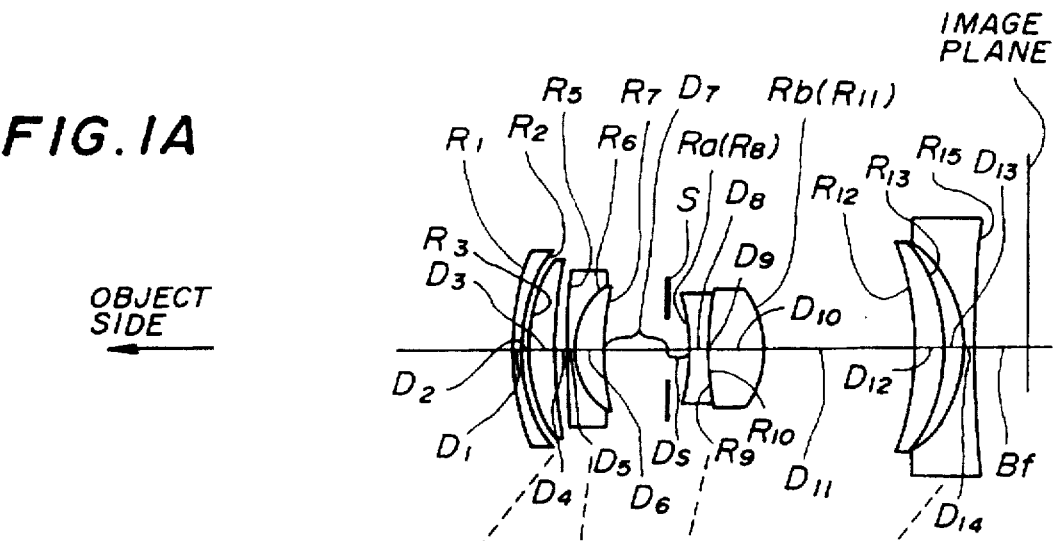
FIGS. 1A, 1B and 1C show an optical system configuration example of a high variable-power ratio, high aperture ratio, zoom optical system according to the present invention, FIG. 1A showing the wide-angle-end formation, FIG. 1B showing the middle formation and FIG. 1C showing the telephoto-end formation.

Configurations and functions of high variable-power ratio, high aperture ratio, zoom optical systems in embodiments according to the present invention will now be described. Those embodiments are described as examples in a case where high variable-power ratio, high aperture ratio, zoom optical systems according to the present invention are applied to a LS camera. Those embodiments use two optical system configurations, examples of which are shown in FIGS. 1A, 1B, 1C, 2A, 2B and 2C.

Reference numerals/symbols used in those descriptions and drawings will now be described:

$F_{No.}$: the F-number;

f: the focal length of the overall optical system;

Bf: the back focus;

ω: the half field angle;

$L_n$: the n-th lens when counted from the lens closest to the object;

No.: the lens face number obtained when counted from the lens face closest to the object;

$R_i$: the radius of curvature of the No.i lens face (optical surface);

$D_i$: the distance on the optical axis between the No.i and No.(i+1) lens faces;

$N_i$: the refractive index of the material of the lens at the d-line where the side of the lens that faces the object is the No.i lens face; and $v_i$: the Abbe's number of the material of the lens at the d-line where the side of the lens that faces the object is the No.i lens face.

Note:

No.S is the number of the diaphragm S.

$R_S$ is the radius of curvature of the diaphragm S and is 0.0; and $D_S$ is the axial length between the diaphragm S and the image side adjacent lens face.

Figure 2A:
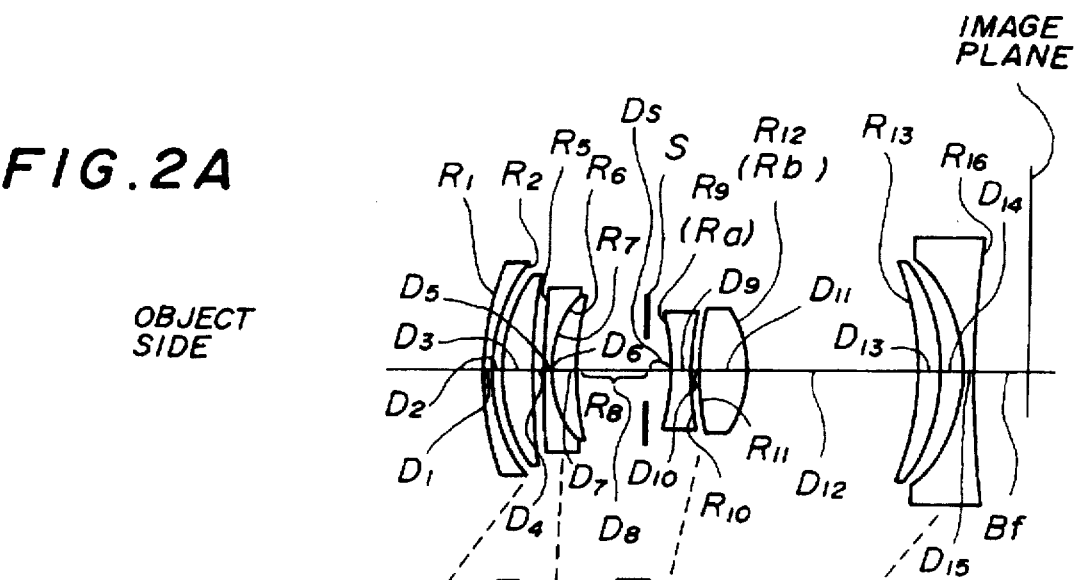
FIGS. 2A, 2B and 2C show another optical system configuration example of a high variable-power ratio, high aperture ratio, zoom optical system according to the present invention, FIG. 2A showing the wide-angle-end formation, FIG. 2B showing the middle formation and FIG. 2C showing the telephoto-end formation.

$D_7$ in FIG. 1A is the axial length between the image side face of the lens $L_4$ and the diaphragm S; and $D_8$ in FIG. 2A is the axial length between the image side face of the lens $L_4$ and the diaphragm S, as shown in those figures.

Each of those high variable-power ratio, high aperture ratio, zoom optical systems (simply referred to as 'high aperture ratio zoom optical system', hereinafter) includes, as shown in FIGS. 1A to 2C, a first zoom lens group I, a second zoom lens group II, a third zoom lens group III and a fourth zoom lens group IV, arranged on the optical axis in that order from the object side. In this optical system, a diaphragm S is arranged in relationship to the third zoom lens group III. The diaphragm S may be a diaphragm which is also used as a lens shutter or may be a diaphragm which is used in combination with a lens shutter.

In the zoom optical system having the above-described basic configuration, in order to achieve a high variable-power ratio, a high aperture ratio and, thus, a high optical performance, it is necessary to configure each of the four zoom lens groups I, II, III and IV to have a power (the reciprocal of focal length) within suitable limits, thus to perform its part, and also to have the total aberrations of the zoom lens group restricted within a small range or amount.

In order to fulfill those conditions, each of the zoom lens groups I, II, III and IV should include one positive lens and one negative lens.

According to the present invention, the first lens group I includes a negative lens $L_1$ and a positive lens $L_2$ which are arranged in that order from the object, and the overall zoom lens group I has a positive focal length. In this case, the negative lens $L_1$ and positive lens $L_2$ are spaced from one another by an air space.

Further, the second lens group II includes a negative lens $L_3$ and a positive lens $L_4$ which are arranged in that order from the object, and the overall zoom lens group II has a negative focal length.

Figure 1B:
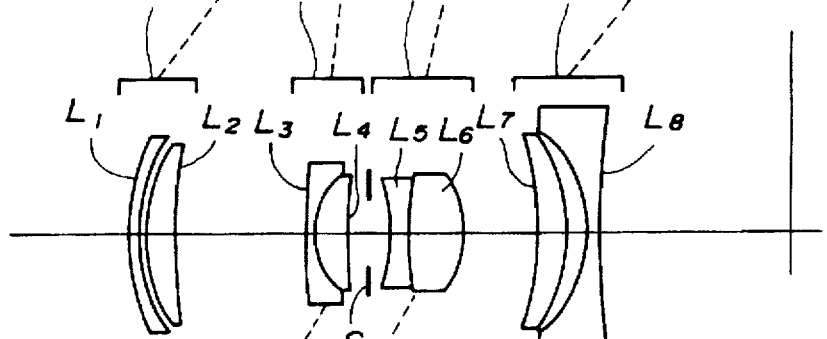
Figure 1C:
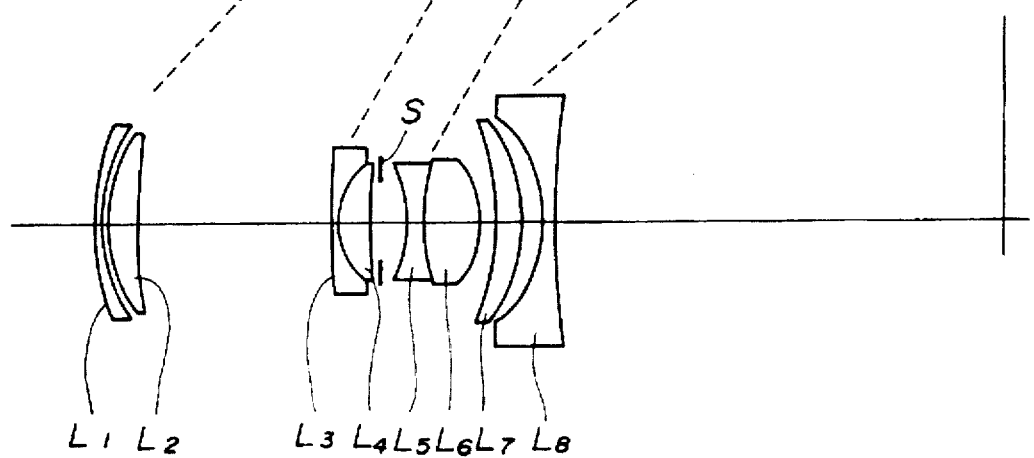
Figure 2B:
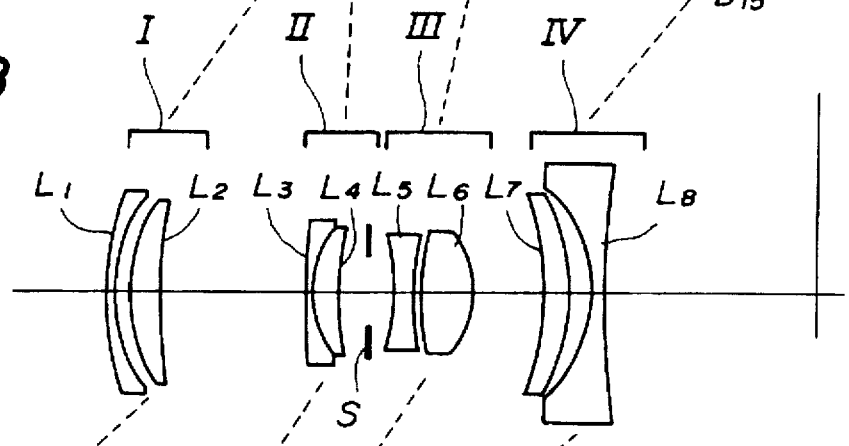
Figure 2C:
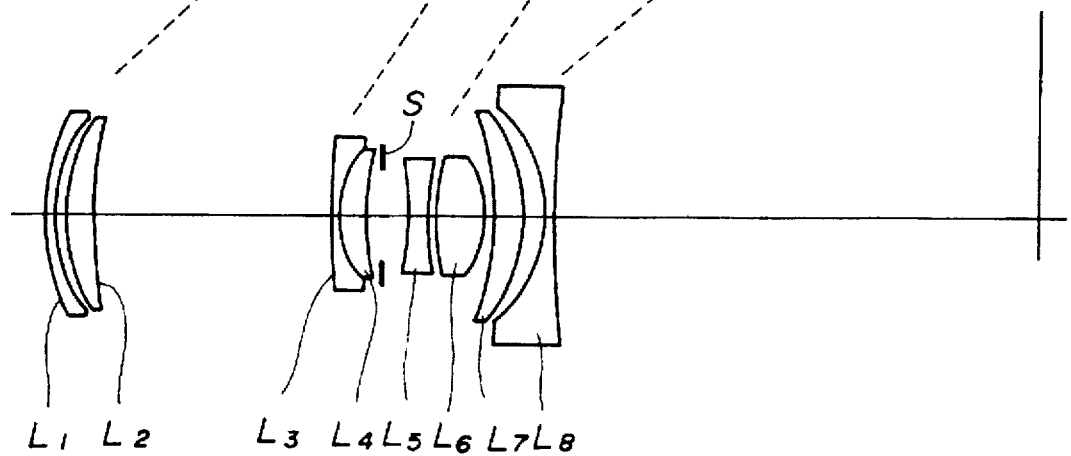
Figure 12E:
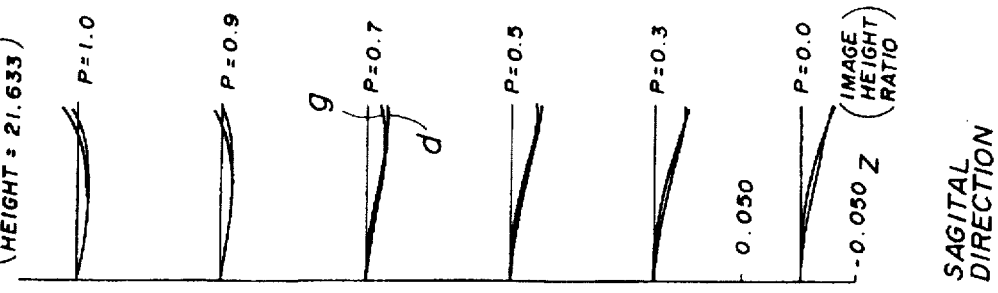
FIGS. 12A, 12B, 12C, 12D and 12E show aberration curves of the spherical aberration, astigmatism, distortion, coma and sine condition of a high variable-power ratio, high aperture ratio, zoom optical system in a fourth embodiment of the present invention using the optical system configuration example shown in FIGS. 1A–1C, FIGS. 12A, 12B, 12C, 12D and 12E showing the aberrations when the high aperture ratio zoom optical system in the fourth embodiment is at the wide-angle-end formation as shown in FIG. 1A.
Figure 12D:
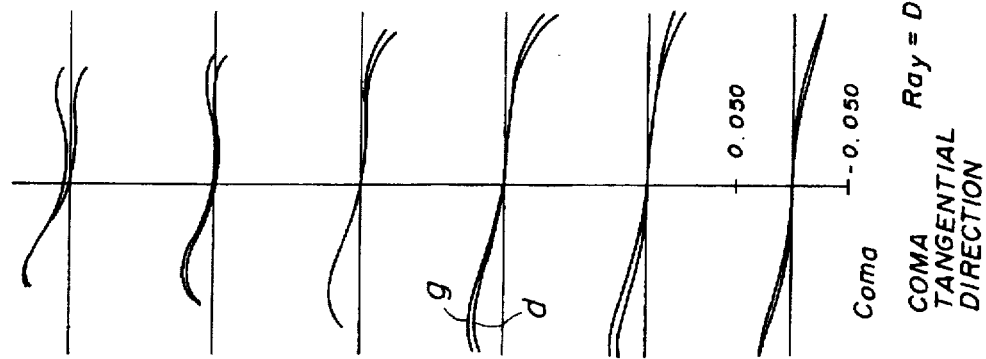
Figures 12A, 12B, 12C:
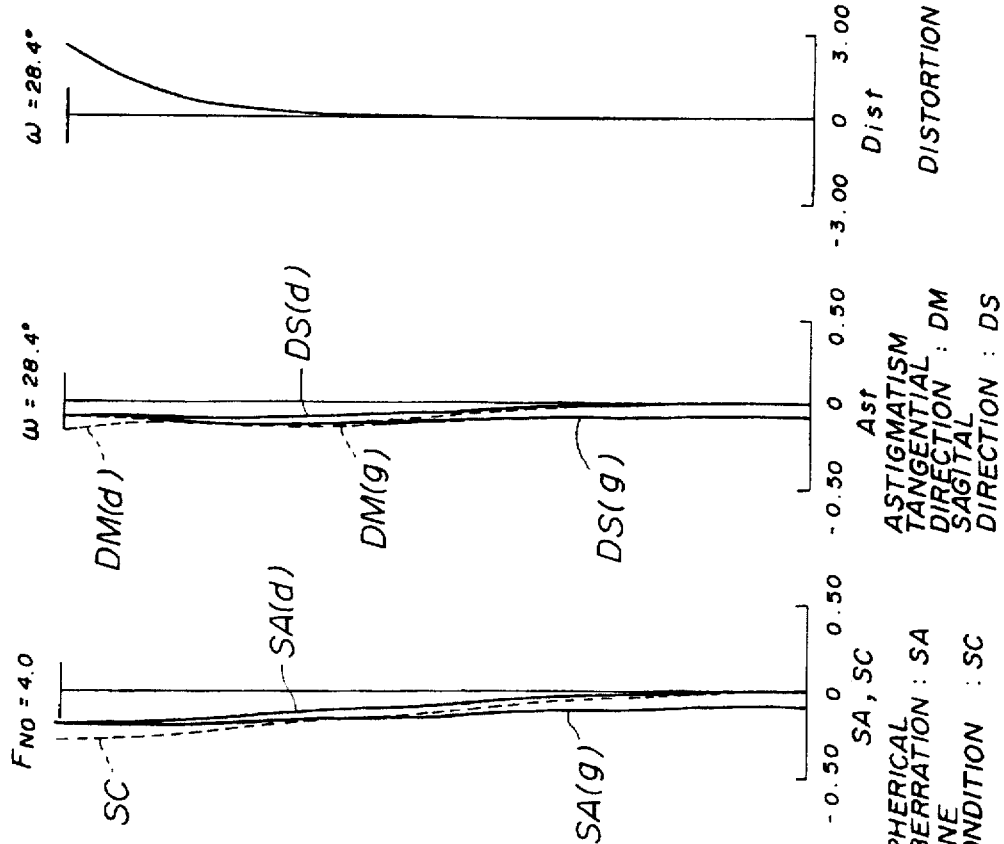

In this case, in the optical system configuration shown in FIGS. 1A to 1C, the negative lens $L_3$ and positive lens $L_4$ are in contact with one another, while in the optical system configuration shown in FIGS. 2A to 2C, the negative lens $L_3$ and positive lens $L_4$ are spaced from one another by an air space. In FIG. 2A, $R_6$ is the radius of curvature of the image side lens face of the lens $L_3$, $R_7$ is the radius of curvature of the object side lens face of the lens $L_4$ and $D_6$ is the distance between those lens faces.

Further, the third lens group III includes a double-concave lens $L_5$ and a double-convex lens $L_6$ which are arranged in that order from the object, and the overall zoom lens group III has a positive focal length. In this case, the double-concave lens $L_5$ and double-convex lens $L_6$ are spaced from one another by an air space. In FIG. 1A, $R_9$ is the radius of curvature of the image side lens face of the lens $L_5$, $R_{10}$ is the radius of curvature of the object side lens face of the lens $L_6$ and $D_9$ is the distance between those lens faces.

Further, the diaphragm S is arranged adjacent to the third zoom lens group III with a fixed spatial relationship therebetween. The diaphragm S is located toward the object side of the third zoom lens group III. The configuration of the high aperture ratio zoom optical system with regard to the diaphragm S will be described later in conjunction with zooming and focusing operations of the zoom optical system.

Further, the fourth lens group IV includes a positive lens $L_7$ and a negative lens $L_8$ which are arranged in that order from the object, and the overall zoom lens group IV has a negative focal length. In this case, the positive lens $L_7$ and negative lens $L_8$ are spaced from one another by an air space.

In the high variable-power ratio, high aperture ratio, zoom optical system, when a zooming operation is performed from the wide-angle-end formation to the telephoto-end formation, at least the first zoom lens group I and fourth zoom lens group IV are moved toward the object side simultaneously. Further, simultaneously, as the two zoom lens groups I and IV move, the axial distance D4 between the first and second zoom lens groups I and II is increased, and also the axial distance (D11 in the configuration shown in FIGS. 1A–1C while D12 in the configuration shown in FIGS. 2A–2C) between the third and fourth zoom lens groups III and IV is decreased.

In this case, it is preferable that the first and fourth zoom lens groups I and IV are moved in a configuration which provides the axial distance between the top lens (negative $L_1$) of the first zoom lens group I and the last lens (negative lens $L_8$) of the fourth zoom lens group IV is always maintained at a fixed distance.

Further, in the high aperture ratio zoom optical system according to the present invention, focusing to a short distance (or focusing to a close distance) is performed by moving the fourth zoom lens group IV toward the image side, or focusing to a short distance is performed by moving the third zoom lens group III toward the object side.

Further, in the high aperture ratio zoom optical system according to the present invention, as described above, the diaphragm S is arranged at the object side of the third zoom lens group III. It is preferable that the configuration of the zoom optical system with regard to the diaphragm S is formed such that the diaphragm and third zoom lens group III are integrally moved in each of the zooming operation and the focusing operation.

Further, as an alternative method, it is also preferable that, in the zooming operation, the diaphragm S and the third zoom lens group III are moved integrally, but, in the focusing operation, the third zoom lens group III is moved toward the diaphragm S which is fixed.

Further, in the high aperture ratio zoom optical system according to the present invention, each of at least one lens face of the lenses included in the third zoom lens group III and at least one lens face of the lenses included in the fourth zoom lens group IV is an aspherical surface.

In this case, where the at least one lens face of the lenses included in the third zoom lens group III is an aspherical surface and is at least one lens face of the double-concave lens $L_5$ of the third zoom lens group III, it is preferable that the configuration of the aspherical surface is such that the diverging power of the lens becomes stronger at a position of the lens which approaches the lens periphery.

Further, in a case where the at least one lens face of the lenses included in the fourth zoom lens group IV is an aspherical surface and is at least one lens face of the positive lens $L_7$ of the fourth zoom lens group IV, it is preferable that the configuration of the aspherical surface is such that the converging power of the lens becomes stronger at a position of the lens which approaches the lens periphery.

As to which lens face of the lenses included in the third zoom lens group III and which lens face of the lenses included in the fourth zoom lens group IV are selected to be aspherical surfaces will be described later in detailed data of the embodiments. Also, particular configurations of those aspherical surfaces will be described later.

In the above-described optical system configuration of the high aperture ratio zoom optical system according to the present invention, the $F_{No.}$ at the telephoto-end formation is F4.8 to F5.6 and thus a high illumination level is provided. Also, in the optical system configuration, the variable-power ratio is 2.85 to 3.35 and thus the zoom optical system having a wide variation-power range is provided. While providing these improvements, the optical system configuration is simplified, cost reduction of the optical system is achieved, and also manufacturing efficiency of the optical system is achieved. Further, the zooming mechanism and the focusing mechanism of the LS camera are simplified, and compactness is improved when the zoom optical system is retracted within the LS camera is improved. For those purposes, suitable conditions are set to the zoom lens groups and particular lenses thereof, respectively.

First, in the high aperture ratio zoom optical system according to the present invention, as described above, when the zooming operation is performed from the wide-angle-end formation to the telephoto-end formation, at least the first and fourth zoom lens groups I and IV are moved toward the object side. Further, as those two zoom lens groups I and IV are moved, the axial distance $D_4$ between the first and second zoom lens groups I and II is increased, and simultaneously, the axial distance $D_{11}$, in the configuration shown in FIGS. 1A–1C ($D_{12}$, in the configuration shown in FIGS. 2A–2C), between the third and fourth zoom lens groups III and IV is decreased.

Thereby, in the zoom optical system according to the present invention, despite the limited movement of each of the zoom lens groups I, II, III and IV, it is possible that the zoom optical system as a whole forms a telephoto-type power arrangement. Thus, reduction of the overall length of the optical system (simply referred to as 'overall length', hereinafter), which is one object of the present invention, has been achieved.

Further, in the zoom optical system according to the present invention, because the diaphragm S is provided to the third zoom lens group III, it is possible to enlarge the entrance pupil diameter at the telephoto-end formation in comparison to the entrance pupil diameter at the wide-angle-end formation. Thereby, limiting variation in the $F_{No.}$ during the zooming operation to be relatively small can be achieved. Thus, provision of a high aperture ratio without enlarging the diaphragm diameter, in particular, at the telephoto-end formation, which is another object of the present invention has been achieved.

Further, in the zoom optical system according to the present invention, in order to achieve a high variable-power ratio, high aperture ratio, zoom optical system having a high optical performance, the following conditions are set for the configurations described above.

Specifically, as the above-mentioned first aspect of the present invention;

$0.2 < |f_1/f_2| < 1.6$; (1)

$0.15 < f_3/f_T < 0.35$; (2)

$0.2 < |f_4/f_T| < 0.4$; and (3)

$1 < |R_a/R_b| < 6$; (4)

where:

$f_1$ represents the focal length of the first zoom lens group I;

$f_2$ represents the focal length of the second zoom lens group II;

$f_3$ represents the focal length of the third zoom lens group III;

$f_4$ represents the focal length of the fourth zoom lens group IV;

$f_T$ represents the focal length of the overall optical system at the telephoto-end formation;

$R_a$ represents the radius of curvature or the radius of paraxial curvature of the object side lens face a of the fifth lens (double-concave lens $L_5$) when counted from the lens closest to the object in the optical system; and $R_b$ represents the radius of curvature or the radius of paraxial curvature of the image side lens face b of the sixth lens (double-convex lens $L_6$) when counted from the lens closest to the object in the optical system.

The above-mentioned condition (1) is set in order to maintain the ratio between the focal length $f_1$ of the first zoom lens group I and the focal length $f_2$ of the second zoom lens group II within suitable limits. If $|f_1/f_2|$ is so small as to be less than the lower limit 0.2, the tendency of the telephoto-type power arrangement becomes stronger. Thereby, although this tendency is advantageous in reduction of the overall length, variation in distortion in the zooming operation increases. Furthermore, it is likely that the spherical aberration at the telephoto-end formation is larger in the negative direction. Thereby, in order to achieve a high optical performance in this condition, it is necessary to use 3 or more lenses, or to use many aspherical surfaces. Thus, the optical system configuration becomes complicated, and such a tendency may adversely affect achievement of the objects of the present invention.

Conversely, if the value $|f_1/f_2|$ exceeds the upper limit of 1.6, the tendency of the telephoto-type power arrangement is reduced, the overall length at the telephoto-end formation is enlarged. Furthermore, the converging function by the combination of the first and second zoom lens groups I and II becomes insufficient, and, in particular, enlargement of the diaphragm diameter at the telephoto-end formation is needed. Thereby, achievement of both compactness and aperture ratio increase becomes difficult.

The above-mentioned condition (2) is necessary for achieving both the miniaturizing of the optical system and optical performance improvement. By the condition (2), the focal distance $f_3$ of the third zoom lens group III mainly for providing the image formation function is defined to be within the limits, through the ratio with the focal distance $f_T$ of the overall optical system at the telephoto-end formation.

In this case, if the value of $f_3/f_T$ is so small as to be less than the lower limit of 0.15, compensation of the spherical aberration is insufficient throughout the zoom range. Conversely, if the value of $f_3/f_T$ is larger than the upper limit of 0.35, the overall length at the wide-angle-end formation is increased, and the amount of movement of the third zoom lens group III required for the zooming operation is increased.

The condition (3) is necessary for achievement a high optical performance, an object of the present invention. By the condition (3), the negative focal distance $f_3$ of the fourth zoom lens group IV is defined to be within the limits, through the ratio with the focal distance $f_T$ of the overall optical system at the telephoto-end formation.

If the value of $|f_4/f_T|$ is so small as to be less than the lower limit of 0.2, it is difficult to adequately limit variation in each aberration in the zooming operation, and it is likely that the distortion at the wide-angle-end formation increases.

Conversely, if the value of $|f_4/f_7|$ is larger than the upper limit of 0.4, it is difficult to keep the back focus Bf in the value required for the practical use. Further, the lens diameter of the back lens in the optical system needs to be enlarged, and also a space which can be used for the mechanisms such as the zooming mechanism may be disadvantageously reduced in the LS camera.

The condition (4) defines the ratio between the radius of curvature or the radius of paraxial curvature $R_a$ of the object side lens face a of the fifth lens (double-concave lens $L_5$) when counted from the lens closest to the object in the optical system and the radius of curvature or the radius of paraxial curvature $R_b$ of the image side lens face b of the sixth lens (double-convex lens $L_6$) when counted from the lens closest to the object in the optical system. Thereby, the total of the aberrations in the third zoom lens group III, especially, the total of the spherical aberrations therein is limited within a small amount. Furthermore, occurrence of higher-order aberrations is maintained within a small amount.

In this case, if the value of $|R_a/R_b|$ is so small as to be less than the lower limit 1, the strong diverging function of the object side lens face a of the double-concave lens $L_5$ is strongly reduced by the image side lens face b of the double-convex lens $L_6$. Thereby, it is difficult to limit the higher-order residual spherical aberration within a small amount.

Conversely, if the value of $|R_a/R_b|$ is larger than the upper limit 6, the concentricity to the pupil is degraded. Thereby, the higher-order components of the other aberrations are likely to occur. Thus, undesirable effects occur.

By achieving a high aperture ratio, especially at the telephoto-end formation, the bundle of rays passing through the first zoom lens group I is widened. Therefore, it is necessary to reduce the aberration occurring thereby.

For this purpose, it is preferable that each of the negative lens $L_1$ and positive lens $L_2$ of the first zoom lens group I, which are spaced from one another by the air space, is a meniscus lens having a convex face which faces the object side. Thereby, occurrence of the spherical aberration, coma and other aberrations can be limited within a small amount.

In this case, each of those two lenses $L_1$ and $L_2$ needs to have a weak power. It is necessary that the Abbe's number of each of the lenses $L_1$ and $L_2$ is defined and thus the total of the chromatic aberrations of the first zoom lens group I is kept within a small amount.

For this purpose, in the zoom optical system according to the present invention, as the above-mentioned second aspect of the present invention, those lenses are configured such that $$15 < v_2 - v_1, \qquad (5)$$

where $v_1$ represents the Abbe's number at the d-line of the negative lens $L_1$ of the first zoom lens group I, and $v_2$ represents the Abbe's number at the d-line of the positive lens $L_2$ of the first zoom lens group I.

In this case, if the value of $v_2-v_1$ does not fulfill the inequality of the above-mentioned condition (5), the chromatic aberration occurring in the first zoom lens group I increases and thus it is not possible to achieve a high optical performance which is an object of the present invention.

Further, the zoom optical system according to the present invention is configured such that, as the above-mentioned third aspect of the present invention, the second zoom lens group II includes the negative lens $L_3$ and positive lens $L_4$. The reasons therefor will now be described.

By the foregoing configuration, it is possible to decrease thickness of the second zoom lens group II. Also, a distance between the principle points of the first and second zoom lens groups I and II can be shortened at the wide-angle-end formation, and also a distance between the principle points of the second and third zoom lens groups II and III can be shortened at the telephoto-end formation. Thereby, it is possible to configure the second zoom lens group II (the lenses $L_3$ and $L_4$) to have weak power under the condition where the above-mentioned condition (1) is fulfilled.

In the case where the second zoom lens group II is configured to have weak power under the condition where the above-mentioned condition (1) is fulfilled, and thus the third zoom lens group's part is reduced, it is possible to configure the second zoom lens group II so that the negative and positive lenses $L_3$ and $L_4$ are in contact with one another. In the case of such a configuration, it is possible to limit, within a small amount, performance degradation occurring due to decentering between the two lenses $L_3$ and $L_4$ and/or errors in manufacturing. As a result, it is possible to improve mass-production efficiency. Therefore, it is preferable that such a configuration is applied under conditions where circumstances permit it.

The third zoom lens group III is configured so that, under the condition where the above-mentioned condition (2) is fulfilled, relatively strong positive power is provided by the lens group III. Further, the lens group III includes the single negative lens $L_5$ and the single positive lens $L_6$. As a result, the paraxial power is such that the negative power is weak while the positive power is strong.

By such a power arrangement, the aberration compensation share amount of the negative lens $L_5$ is insufficient, and, thus, the balance with the aberration compensation share amount of the positive lens $L_6$ is lost. In the zoom optical system according to the present invention, in order to prevent the balance from being lost, at least one lens face of the double-concave lens in the third zoom lens group III is an aspherical surface such that the diverging power thereof becomes stronger at a position of the lens which approaches the lens periphery, as the above-mentioned fourth aspect of the present invention. Thereby, the aberration compensation share amount balance with the positive lens is prevented from being lost without changing the paraxial power.

Because the above-described power arrangement is applied, in the zoom optical system according to the present invention, as the fourth aspect of the present invention, the relationship between the Abbe's numbers of the negative lens (double-concave lens) $L_5$ and the positive lens (double-convex lens) $L_6$ is such that $$25 < v_6 - v_5, \qquad (6)$$

where $v_5$ represents the Abbe's number at the d-line of the negative lens $L_5$, and $v_6$ represents the Abbe's number at the d-line of the positive lens $L_6$. Thereby, the chromatic aberration of the third zoom lens group III is kept within a small value.

By configuring the third zoom lens group III as described above, the chromatic aberration of the third zoom lens group III can be properly compensated within the same lens group III. Therefore, such a configuration is preferable.

If the above-mentioned condition (6) is not fulfilled, the chromatic aberration of the third zoom lens group III may not be kept within a small value.

The fourth zoom lens group IV is configured according to the same way as that applied to the third zoom lens group III described above although the positive and negative are reversed.

Specifically, the fourth zoom lens group IV is configured so that, when the above-mentioned condition (3) is fulfilled, the zoom lens group IV has a relatively strong negative power. Further, the lens group IV includes the single positive lens $L_7$ and the single negative lens $L_8$. As a result, the paraxial power is such that the positive power is weak while the negative power is strong.

By such a power arrangement, the aberration compensation share amount of the positive lens $L_7$ is insufficient, and, thus, the balance with the aberration compensation share amount of the negative lens $L_8$ is lost. In the zoom optical system according to the present invention, in order to prevent the balance from being lost, at least one lens face of the positive lens $L_7$ in the fourth zoom lens group IV is an aspherical surface such that the converging power thereof becomes stronger at a position of the lens which approaches the lens periphery. Thereby, the aberration compensation share amount balance with the negative lens $L_8$ is prevented from being lost without changing the paraxial power.

Because the above-described power arrangement is applied, in the zoom optical system according to the present invention, as the above-mentioned fifth aspect of the present invention, the relationship between the Abbe's numbers of the positive lens $L_7$ and the negative lens $L_8$ is such that $$15 < \nu_8 - \nu_7, \tag{7}$$

where $\nu_7$ represents the Abbe's number at the d-line of the positive lens $L_7$, and $\nu_8$ represents the Abbe's number at the d-line of the negative lens $L_8$. Thereby, the chromatic aberration of the fourth zoom lens group IV is kept within a small value.

By configuring the fourth zoom lens group IV as described above, the chromatic aberration of the fourth zoom lens group IV can be properly compensated within the same lens group IV. Therefore, such a configuration is preferable.

If the above-mentioned condition (7) is not fulfilled, the chromatic aberration of the fourth zoom lens group IV may not be kept within a small value.

As a preferable configuration example, as the above-mentioned sixth aspect of the present invention, when the zooming operation is performed, the first and fourth zoom lens groups I and IV are moved by the same amount. Even under such a condition, optical performance as an object of the present invention is sufficiently achieved.

For this purpose, in the case where the zoom optical system is configured as described above, when the zoom mechanism is designed, it is possible to reduce the number of cam grooves which are used for relative movement of the lens groups according to a predetermined movement procedure. Thereby, as another object of the present invention, the manufacturing cost thereof can be reduced.

Further, it is also possible to simplify mechanisms required for the zooming operation and for causing the camera to receive the zoom optical system within the camera. Thus, it is possible to achieve a compact arrangement of the entire zoom mechanism device including the zoom optical system and necessary mechanisms. Therefore, the above-mentioned configuration is preferable.

Further, the zoom optical system according to the present invention has, as the above-mentioned seventh aspect of the present invention, as a focusing operation feature, the fourth zoom lens group IV having the negative focal length is moved toward the image side, and thus focusing to a short distance is performed.

This configuration is advantageous because it is not necessary to change the overall length of the zoom optical system provided in the zoom mechanism. Further, that configuration is advantageous because it is not necessary to change the position and diameter of the entrance pupil. According to that configuration, it is possible to perform the focusing operation while performing the zoom optical system to be miniaturized.

However, the fourth zoom lens group IV is positioned closest to the image plane at the wide-angle-end formation. Therefore, if the fourth zoom lens group IV moves further toward the image plane for the focusing operation, the lens diameter of the fourth zoom lens group IV may need to be enlarged and/or light intensity at the periphery may be reduced.

In order to solve those problems, as the above-mentioned seventh aspect of the present invention, in the zoom optical system according to the present invention, the image magnification is defined, and thereby the amount of movement of the fourth zoom lens group IV during the focusing operation is set to be a proper amount.

Specifically, the zoom optical system is configured so that $$1 < (\beta_{4W}^2 - 1) f_7 / f_W < 3, \tag{8}$$

where:

$\beta_{4W}$ represents the image magnification of the fourth zoom lens group IV at the wide-angle-end formation; and $f_W$ represents the focal length of the overall optical system at the wide-angle-end formation.

In this case, if the value of $(\beta_{4W}^2 - 1) f_7 / f_W$ is so small as to be less than the lower limit 1 of the above-mentioned condition (8), the amount of movement required for the focusing operation is so large that the back-lens diameter needs to be enlarged and also the peripheral light intensity is reduced. If that value is larger than the upper limit 3 of the condition (8), although the amount of movement required for the focusing operation is reduced, the position precision (focusing sensitivity) should be more strictly managed. This matter brings disadvantages in the manufacturing of the camera.

Further, in the zoom optical system according to the present invention, as the above-mentioned eighth aspect of the present invention, the third zoom lens group III is moved toward the object when the focusing operation is performed, thus, focusing to a short distance. Further, in the zoom optical system according to the present invention, as the above-mentioned ninth aspect of the present invention, the diaphragm S is provided at the third zoom lens group III. Those arrangements are advantageous as described below. The third zoom lens group III is the zoom lens group having the shortest diameter among the four zoom lens groups. Thereby, it is possible to achieve compactness of the focusing mechanism. Furthermore, reduction of the peripheral light intensity due to focusing substantially does not occur and also the effective diameter does not need to be substantially enlarged.

Advantages and disadvantages due to arrangements in combining the diaphragm S and third zoom lens group III will now be described.

In a case where the diaphragm S is provided within the third zoom lens group III, the diaphragm is located between the negative lens (double-concave lens) $L_5$ and the positive lens (double-convex lens) $L_6$. In such an arrangement, a lens holding and moving mechanism and the mechanism of the diaphragm S itself are complicated. Furthermore, it is difficult to assemble the lenses and diaphragm S under the condition where centering between the two lenses is strictly managed. This brings disadvantages in the manufacturing thereof.

In a case where the diaphragm S is provided to the back side of the third zoom lens group III, the front-lens diameter of the lens group needs to be increased, or it is difficult to provide the necessary amount of peripheral light intensity. Thus, this arrangement is disadvantageous.

However, in a case where the diaphragm S is provided to the front side of the third zoom lens group III, those disadvantages in the above-described two cases of the arrangements (the diaphragm S within the zoom lens group and the diaphragm S to the back side of the lens group) can be eliminated. Therefore, the arrangement of the diaphragm S provided to the front side of the third zoom lens group III is the most advantageous.

One configuration example of the zoom optical system according to the present invention is that in which the diaphragm S and the third zoom lens group III are moved integrally. Another configuration of the zoom optical system according to the present invention is that the amount of lens movement required for the focusing operation is set so that the third zoom lens group III moves to a position between the position of the diaphragm S and the original position of the third zoom lens group III. Thus, when the focusing operation is performed, the position of the diaphragm S is fixed and the third zoom lens group III approaches the diaphragm S. In the case where this arrangement is applied, in each of the cases where the diaphragm S is also used as the lens shutter and where the diaphragm S is combined with the lens shutter, a focus motor, which is ordinarily provided integrally with the lens shutter unit, can be utilized for driving the third zoom lens group III for the focusing operation. Thereby, it is possible to omit provision of a focusing ring member.

Especially, there may be a case where a multistage retractable barrel system is applied to the zooming mechanism, and such a body shortening system uses a multiple ring structure which requires 8 to 10 rings to be provided therewith. In such a case, the above-described configuration example, in which the amount of lens movement required for the focusing operation is set so that the third zoom lens group III moves to the position between the position of the diaphragm S and the original position of the third zoom lens group III, is effective for enabling the camera provided with the zoom lens to be miniaturized. Therefore, it is preferable to apply such a configuration.

The embodiments of the present invention will now be described in detail.

In the descriptions, each of the shapes of aspherical surfaces in those embodiments is defined by the following equation (equation-1):

$$z = \frac{(1+R_i)y^2}{1+\sqrt{\{1-(1+k)(y/R_i)^2\}}} + A_4y^4 + A_6y^6 + A_8y^8 + A_{10}y^{10} \quad \text{(EQUATION-1)}$$

where the y-axis corresponds to the optical axis and the z-axis is perpendicular to the optical axis; and where:

k: conical constant;
$A_4$: 4-th order aspherical coefficient;
$A_6$: 6-th order aspherical coefficient;
$A_8$: 8-th order aspherical coefficient; and
$A_{10}$: 10-th order aspherical coefficient.

The above-mentioned equation (equation-1) is a well-known equation.

In table-1B, 2B, 3B, 4B, 5B, 6B and 7B which show the above-discussed constant and coefficient in the embodiments of the present invention and discussed later, K, A4, A6, A8 and A10 means the above-discussed k, $A_4$, $A_6$, $A_8$ and $A_{10}$, respectively. Further, [E-number] in the aspherical coefficients of high orders designates power. For example, in table-1B, $A_4$ of the lens face No.8 is −2.833E-04. Therein, E-04 means $10^{-4}$. Therefore, −2.833E-04 means −2.833× $10^{-4}$. Similarly, in table-1B, $A_{10}$ of the lens face No.13 is −5.274E-12. Therein, E-12 means $10^{-12}$. Therefore, −5.274E-12 means −5.274×$10^{-12}$.

[First Embodiment]

A first embodiment of the present invention will now be described. The first embodiment uses the optical system configuration example shown in FIGS. 1A, 1B and 1C. The second zoom lens group II is configured as a junction-type lens wherein the negative lens $L_3$ and positive lens $L_4$ are in contact with one another. Further, each of the third and fourth zoom lens groups III and IV includes two aspherical surfaces, and thus a total of four aspherical surfaces are used. Thus, this optical system is configured by four groups, eight lenses and thus has a simple configuration.

Even though it is simple, this zoom optical system in the first embodiment according to the present invention has a variable-power ratio of 2.85 and a telephoto-end formation $F_{No.}$ of F5.6. Therefore, in comparison to a similar zoom optical system in the related art, the zoom optical system in the first embodiment is the high variable-power ratio, high aperture ratio, zoom optical system which has a very high illumination level. Detailed data of the zoom optical system in the first embodiment will now be described in the following table-1A, table-1B, and table-1C:

TABLE 1A

| No. | Ri | Di | Ni | vi |
|---|---|---|---|---|
| 1 | 32.147 | 1.000 | 1.67270 | 32.17 |
| 2 | 19.742 | 0.477 | | |
| 3 | 19.636 | 3.425 | 1.69680 | 55.46 |
| 4 | 54.266 | D4 | | |
| 5 | 106.585 | 0.800 | 1.84002 | 29.32 |
| 6 | 9.691 | 3.933 | 1.83271 | 24.09 |
| 7 | 50.012 | D7 | | |
| S | 0.0 | 3.100 | | |
| | (DIAPHRAGM) | | | |
| 8 | −60.903 | 2.364 | 1.80518 | 25.46 |
| 9 | 35.676 | 0.100 | | |
| 10 | 42.546 | 7.000 | 1.62299 | 58.12 |
| 11 | −12.395 | D11 | | |
| 12 | −42.412 | 3.529 | 1.80518 | 25.46 |
| 13 | −24.200 | 2.480 | | |
| 14 | −16.641 | 1.500 | 1.69680 | 55.46 |
| 15 | 160.352 | | | |

TABLE 1B

| No. | K | A4 | A6 | A8 | A10 |
|---|---|---|---|---|---|
| 8 | 60.425 | −2.833E-04 | 1.641E-06 | −3.526E-08 | 1.648E-10 |
| 9 | −52.774 | −5.498E-05 | 3.943E-08 | 4.390E-09 | −1.532E-11 |
| 12 | 0.901 | −1.901E-06 | 5.466E-08 | 3.297E-10 | −4.127E-12 |
| 13 | 1.302 | −4.423E-06 | −1.032E-08 | 1.083E-09 | −5.274E-12 |

TABLE 1C

| | FIG. 1A | FIG. 1B | FIG. 1C |
|---|---|---|---|
| D4 | 1.496 | 16.681 | 25.231 |
| D7 | 7.367 | 2.351 | 1.407 |
| D11 | 19.365 | 9.195 | 1.590 |
| f | 39.141 | 66.077 | 111.544 |
| Bf | 7.0 | 25.668 | 57.369 |

TABLE 1C-continued

|  | FIG. 1A | FIG. 1B | FIG. 1C |
|---|---|---|---|
| $F_{NO}$ | 4.0 | 5.0 | 5.6 |
| ω | 28.4 | 17.7 | 10.8 |

Further, $|f_1/f_2|=0.889$;

$f_3/f_T=0.258$;

$|f_4/f_T|=0.292$; and $|R_a/R_b|=4.914$.

Further, with regard to the aberration compensation conditions/effects, the aberration curves of the high aperture ratio zoom optical system in the first embodiment at the wide-angle-end formation are shown in FIGS. 3A, 3B, 3C, 3D and 3E. The aberration curves of the high aperture ratio zoom optical system in the first embodiment at the middle formation are shown in FIGS. 4A, 4B, 4C, 4D and 4E. The aberration curves of the high aperture ratio zoom optical system in the first embodiment at the telephoto-end formation are shown in FIGS. 5A, 5B, 5C, 5D and 5E. As shown in those figures, each of the spherical aberration, astigmatism, distortion, coma and sine condition (as a whole, simply referred to 'the aberrations', hereinafter) is adequately compensated at each of the wide-angle-end formation, middle formation and telephoto-end formation. Thus, the high aperture ratio zoom optical system in the first embodiment of the present invention has superior optical performances/characteristics.

(In FIGS. 3A, 3B, 3C, 3D, 3E, 4A, 4B, 4C, 4D, 4E, 5A, 5B, 5C, 5D, 5E, 6A, 6B, 6C, 6D, 6E, 7A, 7B, 7C, 7D, 7E, 8A, 8B, 8C, 8D, 8E, 9A, 9B, 9C, 9D, 9E, 10A, 10B, 10C, 10D, 10E, 11A, 11B, 11C, 11D, 11E, 12A, 12B, 12C, 12D, 12E, 13A, 13B, 13C, 13D, 13E, 14A, 14B, 14C, 14D, 14E, 15A, 15B, 15C, 15D, 15E, 16A, 16B, 16C, 16D, 16E, 17A, 17B, 17C, 17D, 17E, 18A, 18B, 18C, 18D, 18E, 19A, 19B, 19C, 19D, 19E, 20A, 20B, 20C, 20D, 20E, 21A, 21B, 21C, 21D, 21E, 22A, 22B, 22C, 22D, 22E, 23A, 23B, 23C, 23D and 23E; SA represents the spherical aberrations and SC represents sine conditions in the spherical aberration curves; and DM represents the astigmatisms in the tangential direction and DS represents the astigmatisms in the sagittal direction in the astigmatism curves. Further, the comas in the tangential direction and sagittal direction are shown, respectively.

Further, with regard to such aberration curves, see Japanese book, 'Lens Designing Engineering', written by Chihei Nakagawa, Aug., 31, 1986, first edition, Tokai University Publishing Society; English book, 'FUNDAMENTALS OF OPTICS', 4th edition, by Francis A. Jenkins & Harvey E. White, McGRAW-HILL BOOK COMPANY; and Japanese book, 'Lens Designing Method', written by Yoshiya Matsui, Nov. 5, 1972, first edition, Kyoritsu Publishing Company.)

This high aperture ratio zoom optical system may be used as a zoom optical system in which the zooming operation is performed by equally moving both the first and fourth zoom lens groups I and IV, for example, and the focusing operation is performed either by moving only the fourth zoom lens group IV or by moving the third zoom lens group III with respect to the fixed diaphragm S, for example.

[Second Embodiment]

A second embodiment of the present invention will now be described. The second embodiment also uses the optical system configuration example shown in FIGS. 1A, 1B and 1C. Thus, this optical system in the second embodiment is configured by four groups, eight lenses, similar to the optical system in the first embodiment, and thus has a simple configuration. Even though it is simple, this zoom optical system in the second embodiment according to the present invention also has a variable-power ratio of 2.85 and a telephoto-end formation $F_{No.}$ of F5.6. Therefore, in comparison to the similar zoom optical system in the related art, the zoom optical system in the second embodiment is a high variable-power ratio, high aperture ratio, zoom optical system which has a very high illumination level. Detailed data of the zoom optical system in the second embodiment will now be described in the following table-2A, table-2B, and table-2C:

TABLE 2A

| No. | Ri | Di | Ni | vi |
|---|---|---|---|---|
| 1 | 22.947 | 1.100 | 1.83769 | 23.98 |
| 2 | 17.194 | 0.100 | | |
| 3 | 16.907 | 3.183 | 1.67383 | 56.41 |
| 4 | 44.167 | D4 | | |
| 5 | 234.183 | 0.800 | 1.83918 | 30.23 |
| 6 | 8.684 | 3.674 | 1.84666 | 23.78 |
| 7 | 58.173 | D7 | | |
| S | 0.0 (DIAPHRAGM) | 3.377 | | |
| 8 | −48.324 | 2.678 | 1.79644 | 24.99 |
| 9 | 32.837 | 0.100 | | |
| 10 | 39.986 | 5.581 | 1.65439 | 57.30 |
| 11 | −12.238 | D11 | | |
| 12 | −27.973 | 3.530 | 1.84666 | 23.78 |
| 13 | −19.303 | 1.365 | | |
| 14 | −15.546 | 1.500 | 1.69680 | 55.46 |
| 15 | 267.515 | | | |

TABLE 2B

| No. | K | A4 | A6 | A8 | A10 |
|---|---|---|---|---|---|
| 8 | 35.484 | −2.994E-04 | 1.634E-06 | −2.508E-08 | −7.120E-11 |
| 9 | −43.497 | −5.346E-05 | 2.013E-07 | 6.173E-09 | −7.633E-11 |
| 12 | −0.089 | 1.807E-06 | −1.004E-08 | 1.698E-09 | −9.591E-12 |
| 13 | 0.865 | 1.629E-06 | −1.946E-08 | 1.739E-09 | −5.075E-12 |

TABLE 2C

|  | FIG. 1A | FIG. 1B | FIG. 1C |
|---|---|---|---|
| D4 | 1.575 | 11.652 | 17.377 |
| D7 | 1.661 | 1.218 | 2.462 |
| D11 | 18.350 | 8.717 | 1.747 |
| f | 39.145 | 66.084 | 111.572 |
| Bf | 7.0 | 26.136 | 57.526 |
| $F_{NO}$ | 4.0 | 5.0 | 5.6 |
| ω | 28.3 | 17.7 | 10.9 |

Further, $|f_1/f_2|=0.724$;

$f_3/f_T=0.257$;

$|f_4/f_T|=0.271$; and $|R_a/R_b|=3.948$.

Further, with regard to the aberration compensation conditions/effects, the aberration curves of the high aperture ratio zoom optical system in the second embodiment at the wide-angle-end formation are shown in FIGS. 6A, 6B, 6C, 6D and 6E. The aberration curves of the high aperture ratio zoom optical system in the second embodiment at the middle formation are shown in FIGS. 7A, 7B, 7C, 7D and 7E. The aberration curves of the high aperture ratio zoom optical system in the second embodiment at the telephoto-end formation are shown in FIGS. 8A, 8B, 8C, 8D and 8E. As shown in those figures, each of the aberrations is adequately compensated at each of the wide-angle-end formation, middle formation and telephoto-end formation. Thus, the high aperture ratio zoom optical system in the second embodiment of the present invention has superior optical performances/characteristics.

Similar to the optical system in the first embodiment, this high aperture ratio zoom optical system in the second embodiment may also be used as a zoom optical system in which the zooming operation is performed by equally moving both the first and fourth zoom lens groups I and IV, for example, and the focusing operation is performed either by moving only the fourth zoom lens group IV or by moving the third zoom lens group III with respect to the fixed diaphragm S, for example.

[Third Embodiment]

A third embodiment of the present invention will now be described. The third embodiment also uses the optical system configuration example shown in FIGS. 1A, 1B and 1C. Thus, this optical system in the third embodiment is configured by four groups, eight lenses, similar to the optical systems in the first and second embodiments, and thus has a simple configuration. Even though it is simple, this zoom optical system in the third embodiment according to the present invention also has a variable-power ratio of 2.85 and a telephoto-end formation $F_{No.}$ of F5.6. Therefore, in comparison to a similar zoom optical system in the related art, the zoom optical system in the third embodiment is the high variable-power ratio, high aperture ratio, zoom optical system which has a very high illumination level. Detailed data of the zoom optical system in the third embodiment will now be described in the following table-3A, table-3B, and table-3C:

TABLE 3A

| No. | Ri | Di | Ni | vi |
|---|---|---|---|---|
| 1 | 25.097 | 1.100 | 1.65572 | 30.63 |
| 2 | 18.697 | 1.091 | | |
| 3 | 18.659 | 4.629 | 1.61120 | 59.59 |
| 4 | 46.280 | D4 | | |
| 5 | 251.809 | 0.800 | 1.83889 | 30.55 |
| 6 | 9.997 | 4.200 | 1.81182 | 24.59 |
| 7 | 61.000 | D7 | | |
| S | 0.0 | 1.639 | | |
| (DIAPHRAGM) | | | | |
| 8 | −63.799 | 2.253 | 1.80286 | 24.82 |
| 9 | 36.064 | 0.100 | | |
| 10 | 40.515 | 7.230 | 1.67944 | 56.17 |
| 11 | −12.759 | D11 | | |
| 12 | −17.769 | 5.000 | 1.84666 | 23.78 |
| 13 | −15.171 | 1.095 | | |
| 14 | −15.907 | 1.500 | 1.69680 | 55.46 |
| 15 | −39920.342 | | | |

TABLE 3B

| No. | K | A4 | A6 | A8 | A10 |
|---|---|---|---|---|---|
| 8 | 64.536 | −2.828E-04 | 1.400E-06 | −3.320E-08 | 1.484E-10 |
| 9 | −48.299 | −5.833E-05 | 2.487E-07 | 2.687E-09 | 2.328E-12 |
| 12 | −1.406 | 1.283E-05 | 7.901E-08 | 7.864E-10 | −3.910E-12 |
| 13 | 0.104 | 3.132E-05 | 9.547E-08 | 4.456E-10 | 2.970E-12 |

TABLE 3C

| | FIG. 1A | FIG. 1B | FIG. 1C |
|---|---|---|---|
| D4 | 1.959 | 16.141 | 22.645 |
| D7 | 8.264 | 2.539 | 2.553 |
| D11 | 18.039 | 9.582 | 3.064 |
| f | 39.135 | 66.065 | 111.520 |
| Bf | 7.0 | 24.606 | 56.376 |
| $F_{No.}$ | 4.0 | 5.0 | 5.6 |
| ω | 29.6 | 17.8 | 10.8 |

Further, $|f_1/f_2|=1.056$;

$f_3/f_T=0.222$;

$|f_4/f_T|=0.269$; and $|R_a/R_b|=5.0$.

Further, with regard to the aberration compensation conditions/effects, the aberration curves of the high aperture ratio zoom optical system in the third embodiment at the wide-angle-end formation are shown in FIGS. 9A, 9B, 9C, 9D and 9E. The aberration curves of the high aperture ratio zoom optical system in the third embodiment at the middle formation are shown in FIGS. 10A, 10B, 10C, 10D and 10E. The aberration curves of the high aperture ratio zoom optical system in the third embodiment at the telephoto-end formation are shown in FIGS. 11A, 11B, 11C, 11D and 11E. As shown in those figures, each of the aberrations is adequately compensated at each of the wide-angle-end formation, middle formation and telephoto-end formation. Thus, the high aperture ratio zoom optical system in the third embodiment of the present invention has superior optical performances/characteristics.

This high aperture ratio zoom optical system in the third embodiment may be used as a zoom optical system in which the zooming operation is performed by equally moving both the first and fourth zoom lens groups I and IV, for example, and the focusing operation is performed either by moving only the fourth zoom lens group IV or by integrally moving the third zoom lens group III and the diaphragm S, for example.

[Fourth Embodiment]

A fourth embodiment of the present invention will now be described. The fourth embodiment also uses the optical system configuration example shown in FIGS. 1A, 1B and 1C. This optical system in the fourth embodiment is configured so that the second zoom lens group II is configured as a junction-type lens, similar to the configuration of the first, second and third embodiments. However, in the fourth embodiment, in each of the double-concave lens $L_5$ of the third zoom lens group III and the double-convex lens $L_6$ of the fourth zoom lens group IV, an aspherical surface is used, and thus a total of two aspherical surfaces are used.

Also in this fourth embodiment, the optical system is configured by four groups, eight lenses, and thus has a simple configuration. Even though it is simple, this zoom optical system in the fourth embodiment according to the present invention has a variable-power ratio of 2.85 and a telephoto-end formation $F_{No.}$ of F5.7. Therefore, in comparison to a similar zoom optical system in the related art, the zoom optical system in the fourth embodiment is the high variable-power ratio, high aperture ratio, zoom optical system which has a very high illumination level. Detailed data of the zoom optical system in the fourth embodiment will now be described in the following table-4A, table-4B, and table-4C:

TABLE 4A

| No. | Ri | Di | Ni | vi |
|---|---|---|---|---|
| 1 | 28.795 | 1.100 | 1.66106 | 30.32 |
| 2 | 20.301 | 1.500 | | |
| 3 | 19.175 | 2.908 | 1.56883 | 62.41 |
| 4 | 55.532 | D4 | | |
| 5 | 40.205 | 0.800 | 1.83999 | 29.36 |
| 6 | 8.718 | 3.705 | 1.81512 | 24.51 |
| 7 | 36.141 | D7 | | |
| S | 0.0 | 2.111 | | |
| | (DIAPHRAGM) | | | |
| 8 | −24.986 | 3.433 | 1.79617 | 25.00 |
| 9 | 62.699 | 0.100 | | |
| 10 | 43.620 | 6.880 | 1.69453 | 55.55 |
| 11 | −13.541 | D11 | | |
| 12 | −29.448 | 3.417 | 1.84666 | 23.78 |
| 13 | −20.203 | 1.124 | | |
| 14 | −18.035 | 1.500 | 1.69680 | 55.46 |
| 15 | 175.409 | | | |

TABLE 4B

| No. | K | A4 | A6 | A8 | A10 |
|---|---|---|---|---|---|
| 8 | −5.208 | −1.485E-04 | −7.886E-07 | 3.378E-09 | −2.042E-10 |
| 12 | −1.165 | 3.401E-06 | 2.266E-08 | −2.116E-10 | 4.777E-13 |

TABLE 4C

| | FIG. 1A | FIG. 1B | FIG. 1C |
|---|---|---|---|
| D4 | 0.874 | 13.039 | 20.485 |
| D7 | 4.217 | 2.752 | 2.905 |
| D11 | 20.113 | 9.412 | 1.812 |
| f | 39.140 | 66.078 | 111.559 |
| Bf | 7.0 | 29.331 | 65.717 |
| $F_{NO.}$ | 4.0 | 5.0 | 5.7 |
| ω | 28.4 | 17.7 | 10.8 |

Further, $|f_1/f_2|=0.323$;

$f_3/f_T=0.279$;

$|f_4/f_T|=0.311$; and $|R_a/R_b|=1.845$.

Further, with regard to the aberration compensation conditions/effects, the aberration curves of the high aperture ratio zoom optical system in the fourth embodiment at the wide-angle-end formation are shown in FIGS. 12A, 12B, 12C, 12D and 12E. The aberration curves of the high aperture ratio zoom optical system in the fourth embodiment at the middle formation are shown in FIGS. 13A, 13B, 13C, 13D and 13E. The aberration curves of the high aperture ratio zoom optical system in the fourth embodiment at the telephoto-end formation are shown in FIGS. 14A, 14B, 14C, 14D and 14E. As shown in those figures, each of the aberrations is adequately compensated at each of the wide-angle-end formation, middle formation and telephoto-end formation. Thus, the high aperture ratio zoom optical system in the fourth embodiment of the present invention has superior optical performances/characteristics.

Similar to the third embodiment, this high aperture ratio zoom optical system in the fourth embodiment may be used as a zoom optical system in which the zooming operation is performed by equally moving both the first and fourth zoom lens groups I and IV, for example, and the focusing operation is performed either by moving only the fourth zoom lens group IV or by integrally moving the third zoom lens group III and the diaphragm S, for example.

[Fifth Embodiment]

A fifth embodiment of the present invention will now be described. The fifth embodiment also uses the optical system configuration example shown in FIGS. 1A, 1B and 1C. This optical system in the fifth embodiment is configured so that the second zoom lens group II is a junction-type lens, similar to the configuration of the first, second, third and fourth embodiments. However, in the fifth embodiment, three lens faces ($R_8$, $R_9$ and $R_{11}$) in the third zoom lens group III and one lens face ($R_{13}$) in the fourth zoom lens group IV are aspherical surfaces. Thus, a total of four aspherical surfaces are used.

Also in this fifth embodiment, the optical system is configured by four groups, eight lenses, and thus has a simple configuration. Even though it is simple, this zoom optical system in the fifth embodiment according to the present invention has a variable-power ratio of 2.85 and a telephoto-end formation $F_{No.}$ of F4.8. Therefore, in comparison to a similar zoom optical system in the related art, the zoom optical system in the fifth embodiment is a high variable-power ratio, high aperture ratio, zoom optical system which has a very high illumination level. Detailed data of the zoom optical system in the fifth embodiment will now be described in the following table-5A, table-5B, and table-5C:

TABLE 5A

| No. | Ri | Di | Ni | vi |
|---|---|---|---|---|
| 1 | 29.361 | 1.100 | 1.71771 | 27.59 |
| 2 | 21.174 | 1.175 | | |
| 3 | 21.162 | 3.733 | 1.66850 | 56.65 |
| 4 | 56.447 | D4 | | |
| 5 | 146.757 | 0.800 | 1.83767 | 32.00 |
| 6 | 11.315 | 3.083 | 1.79941 | 24.91 |
| 7 | 65.843 | D7 | | |
| S | 0.0 | 3.279 | | |
| | (DIAPHRAGM) | | | |
| 8 | −57.247 | 2.825 | 1.80851 | 24.74 |
| 9 | 36.332 | 0.110 | | |
| 10 | 44.960 | 7.250 | 1.69635 | 55.48 |
| 11 | 14.048 | D11 | | |
| 12 | −41.748 | 3.227 | 1.84666 | 23.78 |
| 13 | −25.512 | 1.776 | | |
| 14 | −18.728 | 1.500 | 1.69680 | 55.46 |
| 15 | 115.128 | | | |

TABLE 5B

| No. | K | A4 | A6 | A8 | A10 |
|---|---|---|---|---|---|
| 8 | 48.419 | −2.275E-04 | 1.694E-06 | −3.023E-08 | 1.308E-10 |
| 9 | −46.807 | −4.216E-05 | 1.012E-07 | 1.337E-09 | −5.462E-11 |
| 11 | −0.061 | −2.822E-06 | 2.079E-07 | −5.164E-09 | 5.463E-11 |
| 13 | 1.183 | −2.858E-06 | 2.219E-09 | 1.172E-10 | 2.822E-13 |

TABLE 5C

| | FIG. 1A | FIG. 1B | FIG. 1C |
|---|---|---|---|
| D4 | 1.449 | 17.305 | 26.762 |
| D7 | 7.970 | 2.643 | 1.373 |
| D11 | 20.395 | 9.867 | 1.679 |
| f | 39.137 | 66.070 | 111.532 |
| Bf | 7.0 | 25.1 | 55.398 |
| $F_{NO.}$ | 3.7 | 4.2 | 4.8 |
| ω | 28.9 | 17.8 | 10.9 |

Further, $|f_1/f_2|=0.859$;

$f_3/f_T=0.261$;

$|f_4/f_T|=0.301$; and $|R_a/R_b|=4.057$.

Further, with regard to the aberration compensation conditions/effects, the aberration curves of the high aperture ratio zoom optical system in the fifth embodiment at the wide-angle-end formation are shown in FIGS. 15A, 15B, 15C, 15D and 15E. The aberration curves of the high aperture ratio zoom optical system in the fifth embodiment at the middle formation are shown in FIGS. 16A, 16B, 16C, 16D and 16E. The aberration curves of the high aperture ratio zoom optical system in the fifth embodiment at the telephoto-end formation are shown in FIGS. 17A, 17B, 17C, 17D and 17E. As shown in those figures, each of the aberrations is adequately compensated at each of the wide-angle-end formation, middle formation and telephoto-end formation. Thus, the high aperture ratio zoom optical system in the fifth embodiment of the present invention has superior optical performances/characteristics.

Similar to the first and second embodiments, this high aperture ratio zoom optical system in the fifth embodiment may be used as a zoom optical system in which the zooming operation is performed by equally moving both the first and fourth zoom lens groups I and IV, for example, and the focusing operation is performed either by moving only the fourth zoom lens group IV or by moving the third zoom lens group III with respect to the fixed diaphragm S, for example.

[Sixth Embodiment]

A sixth embodiment of the present invention will now be described. The sixth embodiment uses the optical system configuration example shown in FIGS. 2A, 2B and 2C. This optical system in the sixth embodiment is configured so that the second zoom lens group II is a separate lens group wherein the negative lens $L_3$ and positive lens $L_4$ are separate from one another. Further, in the sixth embodiment, two lens faces in the third zoom lens group III and one lens face in the fourth zoom lens group IV are aspherical surfaces. Thus, a total of three aspherical surfaces are used.

Also in this sixth embodiment, the optical system is configured by four groups, eight lenses, and thus has a simple configuration. Even though it is simple, this zoom optical system in the sixth embodiment according to the present-invention has a variable-power ratio of 3.09 and a telephoto-end formation $F_{No.}$ of F5.6. Therefore, in comparison to a similar zoom optical system in the related art, the zoom optical system in the sixth embodiment is a high variable-power ratio, high aperture ratio, zoom optical system which has a very high illumination level. Detailed data of the zoom optical system in the sixth embodiment will now be described in the following table-6A, table-6B, and table-6C:

TABLE 6A

| No. | Ri | Di | Ni | vi |
|---|---|---|---|---|
| 1 | 28.187 | 1.100 | 1.67087 | 31.05 |
| 2 | 20.775 | 1.400 | | |
| 3 | 20.786 | 3.740 | 1.51379 | 67.34 |
| 4 | 81.030 | D4 | | |
| 5 | 88.447 | 0.800 | 1.83699 | 32.86 |
| 6 | 12.093 | 0.174 | | |
| 7 | 12.313 | 3.241 | 1.82840 | 24.19 |
| 8 | 43.605 | D8 | | |
| S | 0.0 | 3.185 | | |

TABLE 6A-continued

| No. | Ri | Di | Ni | vi |
|---|---|---|---|---|
| | (DIAPHRAGM) | | | |
| 9 | −59.963 | 2.278 | 1.80773 | 24.69 |
| 10 | 38.406 | 0.100 | | |
| 11 | 46.833 | 6.960 | 1.64422 | 57.80 |
| 12 | −12.937 | D12 | | |
| 13 | −41.763 | 3.284 | 1.84666 | 23.78 |
| 14 | −25.331 | 2.635 | | |
| 15 | −17.159 | 1.500 | 1.70868 | 52.85 |
| 16 | 192.364 | | | |

TABLE 6B

| No. | K | A4 | A6 | A8 | A10 |
|---|---|---|---|---|---|
| 9 | 56.746 | −2.683E-04 | 1.343E-06 | −2.187E-08 | 1.125E-10 |
| 10 | −57.590 | −6.780E-05 | 6.620E-08 | 7.680E-09 | −4.916E-11 |
| 14 | 1.086 | −4.820E-06 | −7.351E-09 | 1.812E-10 | −3.180E-13 |

TABLE 6C

| | FIG. 2A | FIG. 2B | FIG. 2C |
|---|---|---|---|
| D4 | 1.132 | 18.467 | 28.882 |
| D8 | 8.214 | 2.633 | 1.982 |
| D12 | 20.716 | 9.873 | 1.626 |
| f | 39.145 | 68.9 | 121.275 |
| Bf | 7.0 | 26.34 | 59.655 |
| $F_{No.}$ | 4.0 | 5.0 | 5.6 |
| ω | 28.3 | 17.0 | 10.0 |

Further, $|f_1/f_2|=1.003$;

$f_3/f_T=0.240$;

$|f_4/f_T|=0.269$; and $|R_a/R_b|=4.635$.

Further, with regard to the aberration compensation conditions/effects, the aberration curves of the high aperture ratio zoom optical system in the sixth embodiment at the wide-angle-end formation are shown in FIGS. 18A, 18B, 18C, 18D and 18E. The aberration curves of the high aperture ratio zoom optical system in the sixth embodiment at the middle formation are shown in FIGS. 19A, 19B, 19C, 19D and 19E. The aberration curves of the high aperture ratio zoom optical system in the sixth embodiment at the telephoto-end formation are shown in FIGS. 20A, 20B, 20C, 20D and 20E. As shown in those figures, each of the aberrations is adequately compensated at each of the wide-angle-end formation, middle formation and telephoto-end formation. Thus, the high aperture ratio zoom optical system in the sixth embodiment of the present invention has superior optical performances/characteristics.

This high aperture ratio zoom optical system in the sixth embodiment may be used as a zoom optical system in which the zooming operation is performed by causing both the first and fourth zoom lens groups I and IV to move relative to each other, for example, and the focusing operation is performed either by moving only the fourth zoom lens group IV or by moving the third zoom lens group III with respect to the fixed diaphragm S, for example.

[Seventh Embodiment]

A seventh embodiment of the present invention will now be described. Similar to the sixth embodiment, the seventh embodiment uses the optical system configuration example shown in FIGS. 2A, 2B and 2C. This optical system in the seventh embodiment is configured so that the second zoom lens group II is a separate lens group wherein the negative lens $L_3$ and positive lens $L_4$ are separate from one another. Further, in the seventh embodiment, three lens faces ($R_9$, $R_{10}$ and $R_{12}$) in the third zoom lens group III and one lens face ($R_{14}$) in the fourth zoom lens group IV are aspherical surfaces. Thus, a total of four aspherical surfaces are used.

Also in this seventh embodiment, the optical system is configured by four groups, eight lenses, and thus has a simple configuration. Even though it is simple, this zoom optical system in the seventh embodiment according to the present invention has a variable-power ratio of 3.35 and a telephoto-end formation $F_{No.}$ of F5.6. Therefore, in comparison to a similar zoom optical system in the related art, the zoom optical system in the seventh embodiment is a high variable-power ratio, high aperture ratio, zoom optical system which has a very high illumination level. Detailed data of the zoom optical system in the seventh embodiment will now be described in the following table-7A, table-7B, and table-7C:

TABLE 7A

| No. | Ri | Di | Ni | vi |
|---|---|---|---|---|
| 1 | 30.624 | 1.100 | 1.84083 | 28.51 |
| 2 | 23.268 | 1.080 | | |
| 3 | 23.485 | 5.000 | 1.55021 | 63.89 |
| 4 | 120.647 | D4 | | |
| 5 | 135.809 | 0.800 | 1.83400 | 37.34 |
| 6 | 14.218 | 0.173 | | |
| 7 | 14.413 | 3.592 | 1.80737 | 24.70 |
| 8 | 43.397 | D8 | | |
| S | 0.0 (DIAPHRAGM) | 4.934 | | |
| 9 | −59.965 | 2.484 | 1.80047 | 26.01 |
| 10 | 39.943 | 0.100 | | |
| 11 | 46.659 | 7.020 | 1.64039 | 57.99 |
| 12 | −13.079 | D12 | | |
| 13 | −73.476 | 3.682 | 1.84666 | 23.78 |
| 14 | 30.766 | 2.582 | | |
| 15 | −18.124 | 1.500 | 1.74428 | 46.68 |
| 16 | 128.895 | | | |

TABLE 7B

| No. | K | A4 | A6 | A8 | A10 |
|---|---|---|---|---|---|
| 9 | 60.216 | −2.559E-04 | 1.365E-06 | −2.830E-08 | 1.474E-10 |
| 10 | −63.083 | −6.491E-05 | 3.035E-08 | 3.669E-09 | −7.123E-11 |
| 12 | −0.037 | 9.061E-08 | 7.695E-08 | −3.140E-09 | 5.070E-11 |
| 14 | 2.644 | −3.587E-06 | 1.172E-08 | 4.297E-11 | 4.252E-13 |

TABLE 7C

| | FIG. 2A | FIG. 2B | FIG. 2C |
|---|---|---|---|
| D4 | 1.136 | 18.988 | 33.535 |
| D8 | 13.169 | 2.331 | 1.472 |
| D12 | 23.065 | 11.356 | 1.403 |
| f | 39.145 | 71.595 | 130.957 |
| Bf | 7.0 | 26.0 | 56.773 |
| $F_{No.}$ | 4.0 | 5.0 | 5.6 |
| ω | 29.2 | 16.4 | 9.2 |

Further, $|f_1/f_2|=1.341$;

$f_3/f_T=0.222$;

$|f_4/f_T|=0.260$; and $|R_a/R_b|=4.585$.

Further, with regard to the aberration compensation conditions/effects, the aberration curves of the high aperture ratio zoom optical system in the seventh embodiment at the wide-angle-end formation are shown in FIGS. 21A, 21B, 21C, 21D and 21E. The aberration curves of the high aperture ratio zoom optical system in the seventh embodiment at the middle formation are shown in FIGS. 22A, 22B, 22C, 22D and 22E. The aberration curves of the high aperture ratio zoom optical system in the seventh embodiment at the telephoto-end formation are shown in FIGS. 23A, 23B, 23C, 23D and 23E. As shown in those figures, each of the aberrations is adequately compensated at each of the wide-angle-end formation, middle formation and telephoto-end formation. Thus, the high aperture ratio zoom optical system in the seventh embodiment of the present invention has superior optical performances/characteristics.

Similar to the sixth embodiment, this high aperture ratio zoom optical system in the seventh embodiment may be used as a zoom optical system in which the zooming operation is performed by causing both the first and fourth zoom lens groups I and IV to move relative to each other, for example, and the focusing operation is performed either by moving only the fourth zoom lens group IV or by moving the third zoom lens group III with respect to the fixed diaphragm S, for example.

Thus, the present invention has been described by example of the seven embodiments including the two optical system configuration examples (one shown in FIGS. 1A–1C and the other shown in FIGS. 2A–2C). However, the present invention is not limited to those, and various may be embodied as variations without departing from the features of the present invention.

For example, in a case where the present invention is applied to a zoom optical system for a video camera and a zoom optical system for a still video camera (SVC), the effects/advantages of the present invention can be sufficiently provided.

What is claimed is:

1. A high variable-power ratio, high aperture ratio, zoom optical system for a lens shutter camera, comprising a first zoom lens group, a second zoom lens group, a third zoom lens group and a fourth zoom lens group arranged on an optical axis in that order from an object side;

wherein:

said first zoom lens group comprises a negative lens and a positive lens arranged in that order from said object side, said first zoom lens group acting as a zoom lens group having a positive focal length;

said second zoom lens group comprises a negative lens and a positive lens arranged from said object side in that order, said second zoom lens group acting as a zoom lens group having a negative focal length;

said third zoom lens group comprises a double concave lens and a double convex lens arranged in that order from said object side, said third zoom lens group acting as a zoom lens group having a positive focal length, said third zoom lens group being provided with a diaphragm;

said fourth zoom lens group comprises a positive lens and a negative lens arranged from said object side in that order, said fourth zoom lens group acting as a zoom lens group having a negative focal length;

wherein, when zooming is performed from a wide-angle-end formation to a telephoto-end formation, at least said first zoom lens group and said fourth zoom lens group move toward said object side, also, with movement of both zoom lens groups, an axial distance between said first zoom lens group and said second zoom lens group increases, and also, an axial distance between said third zoom lens group and said fourth zoom lens group decreases;

wherein:

each of said third zoom lens group and said fourth zoom lens group includes at least one aspherical surface, wherein the following conditions are satisfied:

$$0.2 < |f_1/f_2| < 1.6; \quad (1)$$

$$0.15 < f_3/f_T < 0.35; \quad (2)$$

$$0.2 < |f_4/f_T| < 0.4; \text{ and} \quad (3)$$

$$1 < |R_a/R_b| < 6; \quad (4)$$

where:

$f_1$ represents a focal length of said first zoom lens group;

$f_2$ represents a focal length of said second zoom lens group;

$f_3$ represents a focal length of said third zoom lens group;

$f_4$ represents a focal length of said fourth zoom lens group;

$f_T$ represents a focal length of the optical system at said telephoto-end formation;

$R_a$ represents one of a radius of curvature and a radius of paraxial curvature of the object side lens face a of a fifth lens counted from said object side; and $R_b$ represents one of a radius of curvature and a radius of paraxial curvature of an image side lens face b of a sixth lens counted from said object side.

2. The high variable-power ratio, high aperture ratio, zoom optical system according to claim 1, wherein:

each of said negative lens and said positive lens of said first zoom lens group comprises a meniscus lens having a convex face which faces said object side; and the following condition is satisfied:

$$15 < v_2 - v_1, \quad (5)$$

where:

$v_1$ represents the Abbe's number at the d-line of said negative lens, the first lens when counted from said object side; and $v_2$ represents the Abbe's number at the d-line of said positive lens, the second lens when counted from said object side.

3. The high variable-power ratio, high aperture ratio, zoom optical system according to claim 1, wherein said negative lens and said positive lens of said second zoom lens group are formed as a junction-type lens.

4. The high variable-power ratio, high aperture ratio, zoom optical system according to claim 1, wherein:

at least one face of said double-concave lens of said third zoom lens group being an aspherical surface having a shape such that the diverging power of the lens becomes stronger at a position of said lens which approaches the lens periphery; and the following condition is satisfied:

$$25 < v_6 - v_5, \quad (6)$$

where:

$v_5$ represents the Abbe's number at the d-line of said double concave lens, which is a fifth lens when counted from said object side; and $v_6$ represents the Abbe's number at the d-line of said double-convex lens of said third zoom lens group, which is a sixth lens when counted from said object side.

5. The high variable-power ratio, high aperture ratio, zoom optical system according to claim 1, wherein:

at least one face of said positive lens of said fourth zoom lens group is an aspherical surface having a shape such that the converging power of the lens becomes stronger at a position of said lens which approaches the lens periphery; and the following condition is satisfied:

$$15 < v_8 - v_7, \quad (6)$$

where:

$v_7$ represents the Abbe's number at the d-line of said positive concave lens, which is a seventh lens when counted from said object side; and $v_8$ represents the Abbe's number at the d-line of said negative lens of said fourth zoom lens group, which is a lens located closest to an image side of the optical system.

6. The high variable-power ratio, high aperture ratio, zoom optical system according to claim 1, wherein, when zooming, said first zoom lens group and said fourth zoom lens group move equally so that an axial distance between the lens closest to the object side and the lens closest to the image side are maintained at a fixed distance.

7. The high variable-power ratio, high aperture ratio, zoom optical system according to claim 1, wherein:

a focus operation is performed to a short distance by moving said fourth zoom lens group toward the image side; and the following condition is satisfied:

$$1 < (\beta_{4W}^2 - 1) f_T/f_W < 3, \quad (8)$$

where:

$\beta_{4W}$ represents an image magnification of said fourth zoom lens group at said wide-angle-end formation; and $f_W$ represents the focal length of the overall optical system at said wide-angle-end formation.

8. The high variable-power ratio, high aperture ratio, zoom optical system according to claim 1, wherein focusing is performed to a short distance by moving said third zoom lens group toward said object side.

9. The high variable-power ratio, high aperture ratio, zoom optical system according to claim 8, wherein:

said diaphragm provided with said third zoom lens group is provided at said object side of said third zoom lens group; and said diaphragm movable integrally with said third zoom lens group when zooming and when focusing.

10. The high variable-power ratio, high aperture ratio, zoom optical system according to claim 8, wherein:

said diaphragm provided with said third zoom lens group is provided at said object side of said third zoom lens group;

said diaphragm movable integrally with said third zoom lens group when zooming; and said third zoom lens group movable toward said diaphragm which is fixed, when focusing.

* * * * *